United States Patent
Sorek et al.

(10) Patent No.: US 8,068,693 B2
(45) Date of Patent: Nov. 29, 2011

(54) METHOD FOR CONSTRUCTING A COMPOSITE IMAGE

(75) Inventors: Noam Sorek, Zikhron-Yaakov (IL); Orna Bregman-Amitai, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1167 days.

(21) Appl. No.: 11/826,772

(22) Filed: Jul. 18, 2007

(65) Prior Publication Data

US 2009/0022422 A1    Jan. 22, 2009

(51) Int. Cl.
*G06K 9/32* (2006.01)

(52) U.S. Cl. ......... 382/284; 382/294; 358/540; 358/450

(58) Field of Classification Search .................. 382/235, 382/243, 284, 282; 358/540, 450
See application file for complete search history.

(56) References Cited

U.S. PATENT DOCUMENTS

| | | | |
|---|---|---|---|
| 5,858,400 A | 1/1999 | Williams | |
| 5,907,626 A | 5/1999 | Toklu et al. | |
| 5,999,662 A | 12/1999 | Burt et al. | |
| 6,075,905 A | 6/2000 | Herman et al. | |
| 6,393,163 B1 | 5/2002 | Burt et al. | |
| 6,699,231 B1 | 3/2004 | Sterman et al. | |
| 6,792,043 B1 * | 9/2004 | Takahashi et al. | 375/240.01 |
| 6,798,923 B1 | 9/2004 | Hsieh et al. | |
| 6,850,252 B1 * | 2/2005 | Hoffberg | 715/716 |
| 7,006,881 B1 * | 2/2006 | Hoffberg et al. | 700/83 |
| 7,292,151 B2 * | 11/2007 | Ferguson et al. | 340/573.1 |
| 7,558,618 B1 * | 7/2009 | Williams | 600/473 |
| 7,596,242 B2 * | 9/2009 | Breed et al. | 382/103 |
| 7,599,566 B2 * | 10/2009 | Silverstein et al. | 382/238 |
| 7,653,264 B2 * | 1/2010 | Hero et al. | 382/294 |
| 2002/0107504 A1 | 8/2002 | Gordon | |
| 2002/0181802 A1 | 12/2002 | Peterson | |
| 2004/0130626 A1 | 7/2004 | Ouchi et al. | |
| 2004/0189849 A1 | 9/2004 | Hofer | |
| 2004/0228544 A1 | 11/2004 | Endo et al. | |
| 2005/0008254 A1 | 1/2005 | Ouchi et al. | |
| 2005/0200706 A1 | 9/2005 | Ouchi | |
| 2006/0018547 A1 | 1/2006 | Ouchi | |
| 2006/0062487 A1 | 3/2006 | Ouchi | |
| 2006/0181619 A1 | 8/2006 | Liow et al. | |
| 2006/0190022 A1 | 8/2006 | Beyar et al. | |
| 2007/0025723 A1 | 2/2007 | Baudisch et al. | |
| 2007/0041058 A1 | 2/2007 | Disatnik et al. | |
| 2007/0041616 A1 | 2/2007 | Lee et al. | |
| 2007/0081081 A1 | 4/2007 | Cheng | |

FOREIGN PATENT DOCUMENTS

EP    1613060    1/2006

(Continued)

OTHER PUBLICATIONS

Szeliski "Image Alignment and Stitching: A Tutorial", Technical Report, Preliminary Draft, Will Appear in: Mathematical Models of Computer Vision: The Handbook, 59 P., 2004.

(Continued)

*Primary Examiner* — Yosef Kassa

(57) ABSTRACT

A method for constructing a composite image comprises determining in an alignment between at least a first and a second image based on the content of the first and second image frames, and combining in a transform domain at least the first and second images with the determined alignment to form a composite image.

42 Claims, 15 Drawing Sheets

FOREIGN PATENT DOCUMENTS

| KR | 0286306 | 1/2001 |
| KR | 2006-0006186 | 1/2006 |
| WO | WO 99/51027 | 10/1999 |
| WO | WO 2005/041564 | 5/2005 |
| WO | WO 2006/006169 | 1/2006 |
| WO | WO 2006/114783 | 11/2006 |
| WO | WO 2006/122189 | 11/2006 |

OTHER PUBLICATIONS

Partial European Search Report Dated Jan. 28, 2010 From the European Search Authority Re.: Application No. 081601270.8.

Written Opinion Dated Jul. 12, 2006 From the International Searching Authority Re.: Application No. PCT/IL05/00749.

European Search Report and the European Search Opinion Dated Feb. 12, 2010 From the European Patent Office Re.: Application No. 08160444.9.

International Search Report Dated Jul. 12, 2006 From the International Searching Authority Re.: Application No. PCT/IL05/00749.

Partial European Search Report Dated Jan. 28, 010 From the European Search Authority Re.: Application No. 081601270.8.

Written Opinion Dated Jul. 12, 2006 From the International Searching Authority Re.: Application No. PCT/1L05/00749.

* cited by examiner

METHOD FOR CONSTRUCTING A COMPOSITE IMAGE

RELATED APPLICATION

This application is related to a co-pending application by Natan LINDER et al., entitled "Panoramic Image Production", identified as Ser. No. 11/826,767, and filed on even day.

FIELD OF THE INVENTION

The present invention relates to constructing composite images and more particularly to constructing composite images in a transform domain.

BACKGROUND OF THE INVENTION

With the technical convergence of different media forms, recent mobile devices, e.g. mobile telephones are equipped with various additional functions that offer graphics, audio and video. Mobile devices including cameras have become increasingly popular. Users may, for example capture and save one or more images in their mobile devices by a click of a button.

Due to size, power, and end cost constraints, cameras incorporated in mobile device may typically have limited resolution and/or field of view. One option for overcoming these limitations may include providing a panoramic image feature where a plurality of images may be combined to increase the field of view without compromising resolution. Such images can be created, for example, by digitally capturing, and later joining together, several sequential images. The user may, for instance, capture a first image, pan the camera to the right until a portion of the scene from the first image is viewable through the viewfinder or back panel display, capture the next image, and so on until the full scene is captured with a series of images. Captured images are typically joined using various stitching methods known in the art to form a panoramic image. Typically captured images are stored in memory in a compressed format, e.g. JPEG format.

Typically, JPEG formats employ the Discrete Cosine Transform (DCT) domain to save image data. Typically, the image in the image domain is converted from an RGB color space to an YCbCr color space. The image is split into blocks of 8×8 pixels, 16×16 pixels, or 8 pixels in one direction by 16 pixels in another direction. Each block is converted to a frequency space, typically using the Discrete Cosine Transform (DCT). Subsequently quantization is performed on the high frequency components and Huffman coding is typically applied.

The following patents and applications are generally indicative of current panoramic technology in "stand alone" cameras. The list does not purport to be exhaustive.

US20050152608 to Niemi et al. describes a method for stitching digital images using an image representation format. The image representation format includes data units represented as a Huffman-coded stream of coefficients of basis functions.

U.S. Pat. No. 5,907,626 to Toklu et al describes a method for motion tracking and constructing a mosaic of video objects as well as a method for synthetic object transfiguration from a mosaic. The disclosure of this patent is fully incorporated herein by reference.

U.S. Pat. Nos. 5,999,662 and 6,393,163 to Burt et al. each describe a system for automatically generating a mosaic from a plurality of input images. The disclosure of this patent is fully incorporated herein by reference.

Korean patent 0286306 to Choi describes a method of panoramic photography which uses a digital still camera to connect pictures to construct a panoramic picture using an LCD monitor. The disclosure of this patent is fully incorporated herein by reference.

International application WO/2005/041564 by KONINKLIJKE PHILIPS ELECTRONICS N.V. describes a digital camera with panorama or mosaic functionality. The invention relates to an electronic device with a digital camera, and to a method of enabling to create a composite picture using a digital camera. In some embodiments, the electronic device is a mobile phone. The disclosure of this application is fully incorporated herein by reference.

There are commercially available panoramic picture technologies available for mobile phones. These technologies include, but are not necessarily limited to:
Scalado Autorama™ (Scalado AB; Sweden);
Vivid Panorama (Acrodea; Tokyo; Japan); and
PanoMan™ (Bit Side Technologies; Berlin; Germany).

United States Patent Application 2004136603 to Vitsnudel et al. describes a method for enhancing wide dynamic range in images while the images are in JPEG format. The method comprises: acquiring at least two images of a scene to be imaged, constructing a combined image using image data of pixels of the first image and image data of pixels of the other images proportional to the weight values assigned to each pixel using a defined illumination mask. In some embodiments the acquired images are in JPEG format, the JPEG format including a DCT transform domain. The disclosure of this patent is fully incorporated herein by reference.

SUMMARY OF THE INVENTION

An aspect of some embodiments of the present invention relates to constructing in a transform domain, e.g. a DCT domain, a composite image from a plurality of captured image frames. The plurality of image frames and/or portions of one or more image frames may be stitched and/or juxtaposed to one another to create a composite image including subject matter and/or content from two or more image frames of the plurality of image frames. In some exemplary embodiments, alignment between image frames and/or portions of image frames are user specified. According to some embodiment of the present invention, the composite image is constructed in the transform domain, e.g. in a DCT domain. In an exemplary embodiment, construction is performed by appending image data from two or more image frames block by block. One or more operations may be performed on the appended blocks. In some exemplary embodiments of the present invention, alignment between frames and/or portions of image frames are determined automatically (e.g. without user intervention) based on common features detected in the image frames. According to some embodiments of the present invention, the composite image is a panoramic image. In some exemplary embodiments, the panoramic image is a substantially seamless panoramic image. In other exemplary embodiments, the panoramic image is a mosaic panoramic image.

An aspect of some embodiments of the present invention relates to defining an alignment in the image domain between a series of image frames and constructing a panoramic image from the series of image frames in a transform domain based on the defined alignment. According to some embodiments of the present invention, the transform domain is a DCT transform domain, e.g. a DCT transform domain typically used in JPEG compression format. According to some embodiments of the present invention, the alignment is defined in real time while capturing the series of image frames to form the panoramic image. According to some embodiments of the present invention, construction and/or stitching of the panoramic image is performed in a post processing procedure based on the defined alignment, e.g. subsequent to saving the series of image frames in a compressed format, e.g. JPEG format. According to some embodiments of the present invention, processing of the image frames in a compressed format is performed in resolution of blocks, e.g. DCT transform blocks.

According to some embodiment of the present invention, interesting features in an image frame near a border to be an overlapping border in the panoramic image is detected in the image domain and the coordinates and/or position of the interesting features are saved and/or recorded. Upon capturing a subsequent image frame, the coordinates of the depicted features is identified in the subsequent image and horizontal as well as vertical shifting between the first and subsequent image, e.g. shifting transformations, is defined. Typically, the image frames included in the panoramic image are full snapshot frames. Optionally the panoramic may include one or more preview images, e.g. lower-resolution image frames.

According to some embodiments of the present invention, a preview image frame corresponding to a captured snapshot image frame is retained in memory in the image domain and used to determine alignment and/or registration between the captured snapshot image frame and a subsequent captured image frame. According to some embodiments of the present invention, the subsequent captured image frame is a snapshot image frame. According to some embodiments of the present invention, alignment between two captured snapshot images is determined based on registration between two corresponding preview image frames corresponding to the two captured snapshot image frames.

According to some embodiments of the present invention, alignment between two image frames included in a panoramic is defined based on alignment between a series of captured image frames where only the first and last image frames of the series are included in the panoramic image. The shift, e.g. horizontal and vertical shift, is defined as the sum total of shifting between each of the image frames in the series. In some exemplary embodiments, the image frames between the first and last image frames are preview images.

According to some embodiments of the present invention, one or more image frames captured in a series may not be included in the panoramic image, e.g. due to quality of the image frames. Optionally, selection of the image frames to be included in the panoramic is performed in real time. Optionally the selection is based on real time detection of the dynamic range of the image and/or the sharpness of the image. Optionally, the size of the panoramic image is defined in real time based on accumulated shift transformation between the selected image frames to be included in the panoramic and saved for use during post processing. Optionally, geometrical projection, e.g. cylindrical projection, spherical projection, and/or lens correction projection is applied on images before shift calculation.

According to some embodiments of the present invention, a substantially seamless panoramic image is constructed from a series of over-lapping image frames. Horizontal and vertical shifting required to stitch image frames is defined in the image domain as described hereinabove. The shifting, e.g. horizontal and/or vertical is defined in number of block shifts, where the block shifts correspond to the block size of the transform domain, e.g. DCT domain used to compress the image frame size. In some exemplary embodiments of the present invention, residual shifting, e.g. shifting that is less than a single block size is performed in the image domain, e.g. in real time prior to saving the image frame in a compressed format.

According to some embodiment of the present invention, the image frames are stitched in the transform domain, e.g. in a compressed format in DCT domain. In an exemplary embodiment, an empty image, e.g. an empty image the size of the panoramic image, is defined in the transform domain and each image frame in the series is sequentially added to the empty image in a position based on the defined shifting transformation. Typically, a mask is defined in the transform domain to facilitate stitching the image frames. Optionally, the mask facilitates performing image intensity correction on the image frames. Optionally, the mask facilitates cropping the series of image frames to form a single rectangular image. Optionally, text and/or graphics may be superimposed on the constructed panoramic. Optionally, superimposing the text and/or graphics is facilitated by the defined mask.

According to some embodiments of the present invention, the panoramic image is a mosaic including an arrangement of a series of captured images juxtaposed in relation to each other to convey a panoramic effect. In some exemplary embodiments, a mosaic option may be selected when overlap between the series of captured images is insufficient to stitch images, when vertical shift between images is large, when processing power is limited, and/or when a specific graphic affect of a mosaic is desired. According to some embodiments of the present invention, horizontal and vertical shifting required to construct mosaic with a panoramic feel is defined in the image domain as described hereinabove. The shifting is defined in number of block shifts, where the block shifts correspond to the block size of the transform domain. Optionally, required shifting that is less than a single block size is disregarded. Optionally, horizontal and vertical shifting required to construct mosaic with a panoramic feel is defined based on a low pass image constructed from the transform domain, e.g. low pass image constructed from the DC portion of the transform domain.

According to some embodiment of the present invention, the image frames are positioned in a mosaic in the transform domain, e.g. DCT domain, after the image frames have been saved in a compressed format. In an exemplary embodiment, an empty image the size of the panoramic image is defined in the transform domain and each image frame in the series of image frames is sequentially added to the empty image based on the defined shifting transformation. Optionally, a mask on the empty frame defines one or more decorative empty frames and the series of image frames is positioned in the empty spaces of the decorative frames. Optionally, the mask facilitates performing image intensity correction on the image frames. Optionally, text and/or graphics may be superimposed on the mosaic. Optionally, superimposing the text and/or graphics is facilitated by the defined mask. Optionally the image frames may be at least partially stitched, e.g. a section and/or a portion if adjacent images are stitched.

According to some embodiments of the present invention, capturing and constructing the panoramic image is performed on a mobile device including at least a camera to capture images, a processor to construct the panoramic image from a group of captured images, and a memory to store the captured images and the panoramic image. In some exemplary embodiment, a motion tracking device provides feedback to the user on the alignment between the images.

An aspect of some embodiments of the present invention relates to displaying a panoramic image at different zoom levels. According to some embodiments of the present invention, when a user inputs a command to zoom-in a specific area of the panoramic image, one of the original images captured used to construct the panoramic image may be selected for display. The displayed image may be replaced by an alternate image included in the panoramic in reaction to a user panning to a different area in the panoramic image.

An exemplary embodiment of the present invention provides a method for constructing a composite image, the method comprising determining in an alignment between at least a first and a second image based on the content of the first and second image frames, and combining in a transform domain at least the first and second images with the determined alignment to form a composite image.

Optionally, the composite image is a panoramic image.

Optionally, determining an alignment between at least a first and a second image is performed in the image domain.

Optionally, the transform domain is a DCT transform domain.

Optionally, the alignment includes a horizontal or vertical shift of the second image frame with respect to the first image frame.

Optionally, the horizontal or vertical shift is divided into block shifts and residual shifts.

Optionally, the residual shifts are performed in an image domain prior to transforming the second image to the transform domain.

Optionally, the block shifts are performed in the transform domain.

Optionally, the method comprises detecting in the image domain a location of a common interesting feature in each of the first and second image frame, and determining the alignment based on the location of the interesting feature in each of the first and second image frames.

Optionally, the method comprises performing registration between preview image frames corresponding to the first and second image frames, and determining the alignment between the first and second image frames based on the registration.

Optionally, the method comprises determining alignment between the first and second image frames based on alignment with at least one image frame captured between the first and second image frames.

Optionally, the at least one image frame is a preview image frame.

Optionally, the method comprises recording a size of the composite image based on the alignment.

Optionally, the method comprises determining in an image domain, an intensity level of a captured image frame and selecting the captured image frame for the combining responsive to the determined intensity level.

Optionally, the geometrical transformation is a cylindrical transformation.

Optionally, at least one of the first or second image frames is a full snapshot image frame.

Optionally, the method comprises saving the first and second image frame in a JPEG format.

Optionally, the method comprises defining an empty image frame in the transform domain, and positioning the first and second image frame onto the empty image frame based on the alignment.

Optionally, the method comprises defining a header file with memory allocation, and adding a stream of image data blocks from the first and second image frame to the header file.

Optionally, the method comprises applying a mask in the transform domain to combine the first and second image frame.

Optionally, the mask is a binary mask.

Optionally, the mask is a continuous mask.

Optionally, the mask is a low pass version of a binary mask.

Optionally, the mask is to define a stitching line to combine the first and second image frame in an overlapping region.

Optionally, the stitching line is a curved stitching line.

Optionally, the method comprises detecting a region including a pre-defined pattern and defining a stitching line that circumvents the region.

Optionally, the pre-defined pattern is a face.

Optionally, the method comprises applying a mask configured to correct image intensity differences between the first and second image frame.

Optionally, the mask is configured to correct for vignettes.

Optionally, the method comprises combining in the transform domain a decorative background with the composite image.

Optionally, the method comprises combining in the transform domain text with the composite image.

Optionally, the method comprises combining in the transform domain graphics with the composite image.

Optionally, the method comprises combining decorative frames with the composite image.

Optionally, the panoramic image is a substantially seamless panoramic image.

Optionally, the panoramic image is a mosaic panoramic image frame.

Optionally, the method comprises capturing a plurality of image frames and selecting in the image domain, image frames from the plurality of image frames to be included in the composite image.

Optionally, the selecting is based on a detected intensity level of the image frames.

Optionally, the selecting is based on a detected sharpness level of the image frames.

Optionally, the selecting is based on the alignment between the image frames.

Optionally, the combining is performed in a vertical direction.

Optionally, determining an alignment between at least a first and a second image is performed in the transform domain.

Optionally, the alignment is determined based on a DC portion of the transform domain.

Optionally, the method comprises determining in the transform domain, the intensity level of one of the first and second image frames.

An exemplary embodiment of the present invention provides a system for constructing a composite image comprising a camera to capture a series of image frames in an image domain, a storage unit for storing image frames from the series of image frames in a transform domain, and a control unit for generating in a transform domain a composite image from the image frames stored based on a defined alignment between the image frames.

Optionally, the transform domain is a DCT domain.

Optionally, the image frames are stored in JPEG format.

Optionally, the control unit is configured to determine the alignment between the series of image frames.

Optionally, the control unit is configured to perform registration between at least two of the series of image frames.

Optionally, the series of image frames includes preview image frames.

Optionally, the series of image frames includes full snapshot image frames.

Optionally, the control unit is configured to detect a location of a common interesting feature in each of at least two image frames from the series.

Optionally, the control unit is configured to determine an alignment between the at least two image frames based on the detected location in each of the at least two image frames.

Optionally, the system comprises a pattern detection engine configured to detect a feature in at least one of the series of image frames.

Optionally, the system comprises a camera navigation unit configured to perform motion tracking based on image frames or a video stream captured by the camera and wherein the defined alignment is based on data from the motion tracking.

Optionally, the camera navigation unit is to determine when to capture each image frame in the series.

Optionally, the system comprises a user input unit to input user commands.

Optionally, the system is a mobile system.

An exemplary embodiment of the present invention provides a method for displaying a panoramic image at different zoom levels, the method comprising determining a region in a panoramic image to be displayed in zoom-in mode, selecting an image frame from a plurality of image frames used in constructing the panoramic image when the zoom-in level is above a defined threshold and applying zoom-in to the corresponding region in the selected image frame.

Optionally, the method comprises switching to an alternate image frame when the approaching a region where two image frames are combined.

Optionally, the method comprises displacing a stitching line between combined image frames from a region to be viewed in the zoom-in mode.

Optionally, the threshold is defined as 120 percent magnification.

BRIEF DESCRIPTION OF THE DRAWINGS

The subject matter regarded is particularly and distinctly claimed in the concluding portion of the specification. Non-limiting examples of embodiments of the present invention are described below with reference to figures attached hereto, which are listed following this paragraph. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. For example, the dimensions of some of the elements may be exaggerated relative to other elements for clarity.

Figure 1:
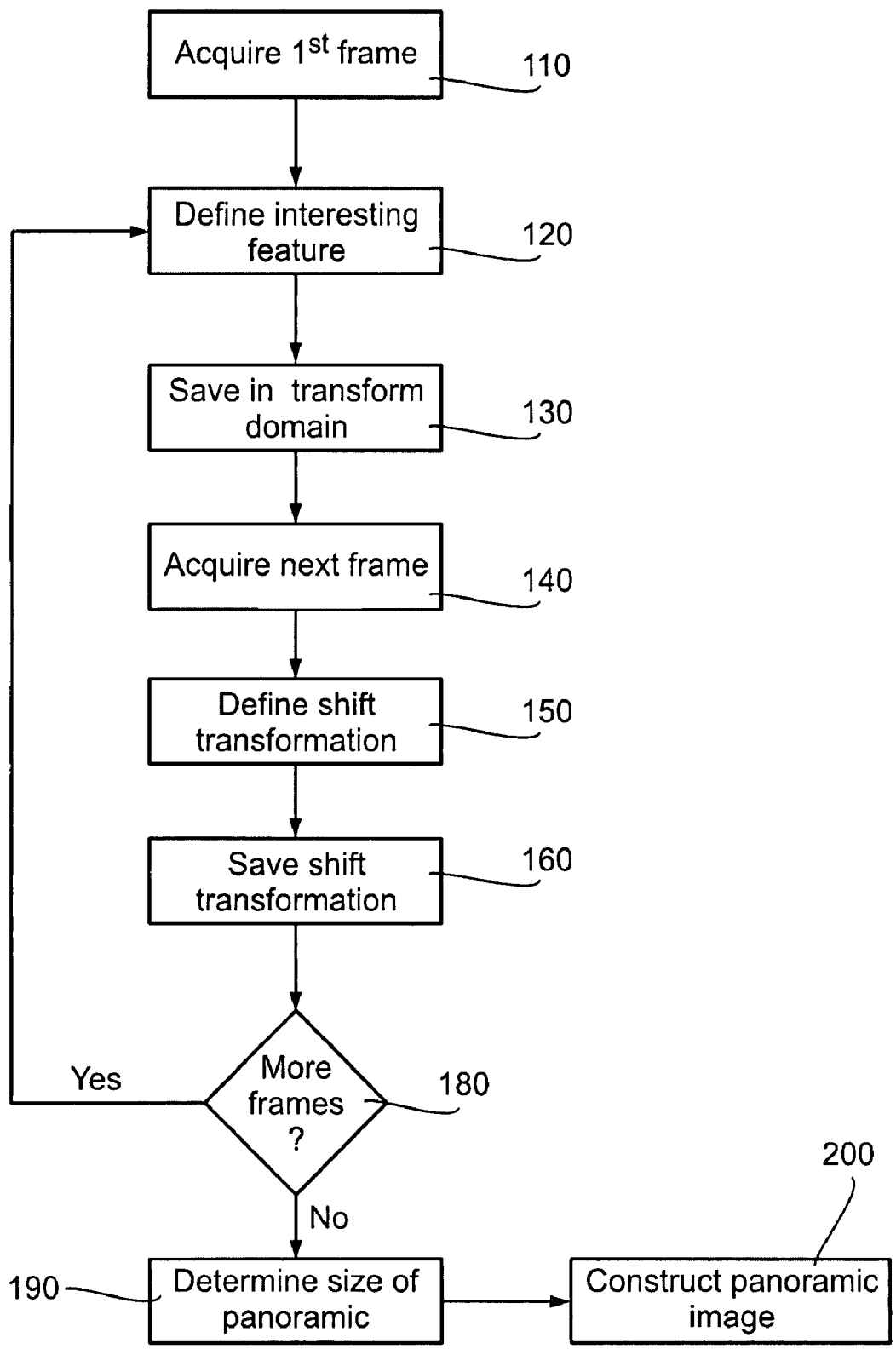
FIG. 1 is an exemplary flow chart describing a method for constructing a panoramic image according to some embodiments of the present invention.

It will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION OF EXEMPLARY EMBODIMENTS

In the following description, exemplary, non-limiting embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Typically, when using known methods to construct a panoramic image, a group, sequence and/or a series of image frames saved in a compressed format, e.g. JPEG format are expanded and brought up in cache memory so that registration between the images may be defined and the stitching between the images may be carried out. Typically, the full uncompressed result image, e.g. panoramic image, as well as templates for printing the image are also brought up on memory before compressing the image. The amount of available memory is a limiting factor in constructing the panoramic image. Available memory in mobile devices including cameras and especially mobile telephones may be limited and/or expensive. The present inventors have found that constructing the panoramic image in the compressed transform domain increases the working limit of available cache memory. The present inventors have also found that pre-determining the alignment in the image domain enables faster post-processing of panoramic images in the transform domain. The present inventors have also found that the maximum size of a panoramic image that can typically be constructed using known methods can be increased when using the methods described herein.

Reference is now made to FIG. 1 showing a method for constructing a panoramic image according to some embodiments of the present invention. According to some embodiments of the present invention, a first frame is captured (block 110). Typically the first frame of the series of frames making up the panoramic image is a full snapshot frame. A snapshot image is a full size, full quality and/or full resolution image frame. Optionally, geometrical projection, e.g. cylindrical projection, spherical projection, and/or lens correction projection is applied on the image prior to a shift calculation between image frames. The coordinates of one or more interesting features are optionally determined and recorded (block 120), e.g. interesting features common in neighboring frames. Typically, the interesting feature is selected, e.g. automatically selected without user intervention, near the border where overlapping with a subsequent image frame is to occur. Interesting features may be detected based on edge detection and/or other known methods. In some exemplary embodiments, interesting features may be user selected. In exemplary embodiments, the direction in which the subsequent images are to be captured is detected with the help of motion tracking. For example, motion tracking may be used to detect the direction in which the user pans the camera to identify the border of the image frame to be subsequently combined with a subsequent image frame, e.g. left, right, upper, or lower border. Interesting features may be extracted from the full snapshot frame and/or from a corresponding preview image, e.g. a preview image captured in substantially the same spatial position as the snapshot frame. A preview image is a low resolution image. In an exemplary embodiment, coordinates of a specific feature may not be detected but instead a preview image may be maintained in memory for registration with a subsequent image. The first acquired frame is saved in a transform domain and typically compressed (block 130). A subsequent frame is captured (block 140) typically offset from the first frame. The subsequent image frame may be a full snapshot frame or a preview image. Optionally, geometrical projection, e.g. cylindrical projection, spherical projection, and/or lens correction projection is applied on image before the shift calculation. Typically, the subsequent frame shares an overlapping border with the previous captured frame, e.g. the first captured frame. Shift mapping between the two images frames is performed (block 150), for example, based on the defined coordinates of the interesting features and/or based on registration between two corresponding preview images. Typically the horizontal and vertical shifting required to combine the two images is defined. Optionally, tilt between the two images is defined and a correction for tilt between the two images is performed. The shift mapping is saved (block 160). In some embodiments of the present invention values, e.g. pixel values and horizontal and vertical (XY) coordinates of interesting features from one image are saved. Subsequently, correlation between the saved interesting features and features of the subsequent image is determined. Based on the determined correlation, shift coordinates are saved, for example, as number of pixels to shift one image relative to a subsequent or previous image in the XY direction. Optionally, registration is performed on two full snapshot image frames. A query, e.g. a query to the processor, to determine if more frames are to be added to the panoramic image is made (block 180). If more images are to be added, interesting features near the new overlapping border is defined (block 120) and the described process is repeated. Optionally, once all the image frames have been captured, the resultant size of the panoramic is determined (block 190). For example, the size of the panoramic is determined based on the original size of each image frame and the accumulated map shifting and/or overlapping of the image frames. The size of the panoramic may be saved. During a post processing procedure the panoramic image is constructed (block 200).

Typically the image frames are saved in a JPEG format utilizing the DCT domain. In other exemplary embodiments, a wavelet domain may be utilized. In some exemplary embodiment of the present invention, the captured image frame may be rotated so that stitching is performed in the vertical direction, e.g. rotated in 90 degrees prior to saving. Optionally, the series of images combine in a vertical direction and rotation is not required. Stitching in the vertical direction may improve memory and file management by reducing the number of parallel files/streams that need editing when combining the image frames. Rotating the transformed images allows stitching and/or combining to be performed in the vertical direction, so there is no need to know the final length of the image, or to handle more then two images at a time.

Figure 2A:
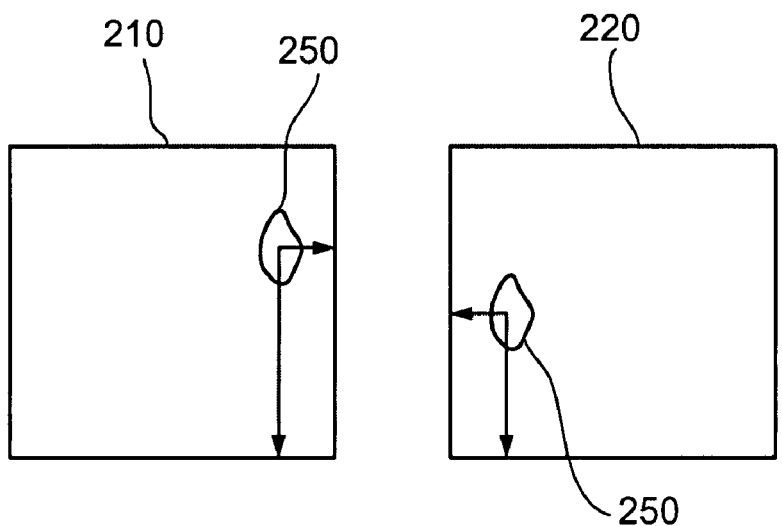
FIG. 2A and 2B are schematic images with interesting features used to define shifting transformation according to some embodiments of the present invention.
Figure 2B:
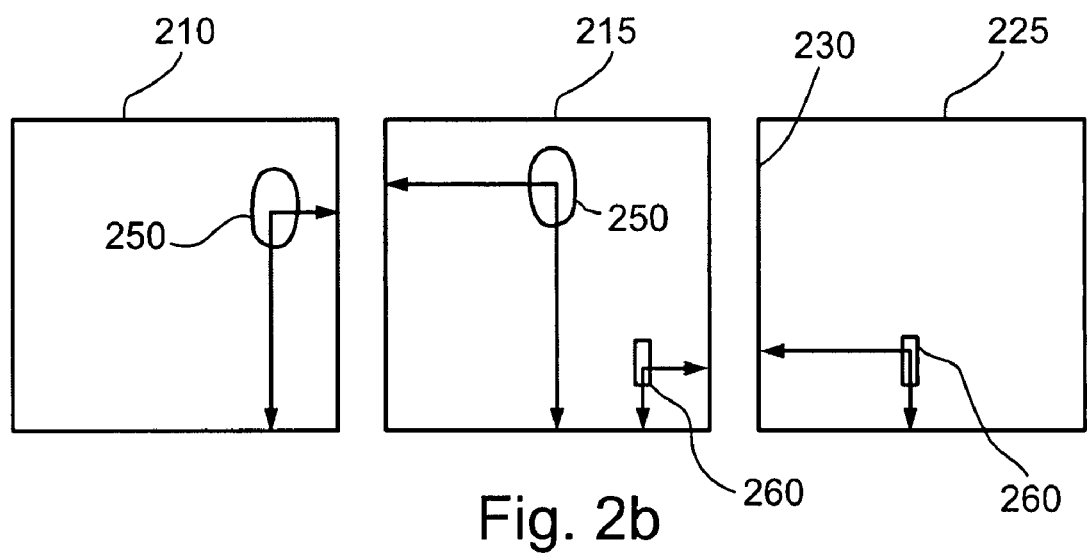

Reference is now made to FIG. 2A and FIG. 2B showing schematic image frames with interesting features used to define shift transformation according to some embodiments of the present invention. Image processing methods known in the art may be used to identify interesting features in one frame and its corresponding location and/or coordinates in an overlapping frame. In one exemplary embodiment, edge detection may be used to detect an interesting feature that can be used to align image frames. In FIG. 2A, interesting feature 250 is identified in frame 210 and its overlapping frame 220. The relative horizontal and vertical position of object and/or interesting feature 250 on each of the frames can be used to determine the shift transformation required to overlap and/or align the two images. In some exemplary embodiments, more than one interesting feature is used to align the image and/or complete registration between the image frames, e.g. preview images frames is performed to determine alignment of images. According to some embodiments of the present invention, frames 210 and 220 are rotated clockwise by 90 degrees and stitched in a vertical direction.

In some exemplary embodiments, two frames to be combined may not share a detected overlapping feature, e.g. a detected interesting feature and/or may only partially share a detected overlapping feature so that there may not be enough information to align the images. According to some embodiments of the present invention, one or more preview images and/or snapshot images that are not to be included in the resultant panoramic image are used to determine the alignment between two image frames. For example, in FIG. 2B image frame 215 is not intended to be included in a resultant panoramic image however is used to align image frame 210 and 225 that will be included in the resultant panoramic image. The required shift between frames 210 and 225 is the sum of the shift between frame 210 and 215 and between frame 215 and frame 225. Typically, the in-between image frames, e.g. image frame 215, are preview images, however, snapshot images may also be used. For example a snapshot image that is detected to be blurry may be used to align images but may not be included in the resultant panoramic image. In FIG. 2B detected interesting feature 250 appears in frames 210 and 215 and partially in frame 225. Detected feature 250 is used to determine the shift transformation between frame 210 and 215. Interesting feature 260 has been detected in frame 215 and 225 and is used to determine the shift transformation between frames 215 and 225. In other embodiments of the present invention, a plurality of in-between image frames may be used to align two end frames, e.g. frames 210 and 225. Typically the in between image frames are not saved to memory. Once the required shift transformation between the end image frames is determined, the in between image frames can be discarded. In some exemplary embodiments of the present invention, motion tracking is utilized to give a general indication of the required shift transformation between two images.

Figure 3:
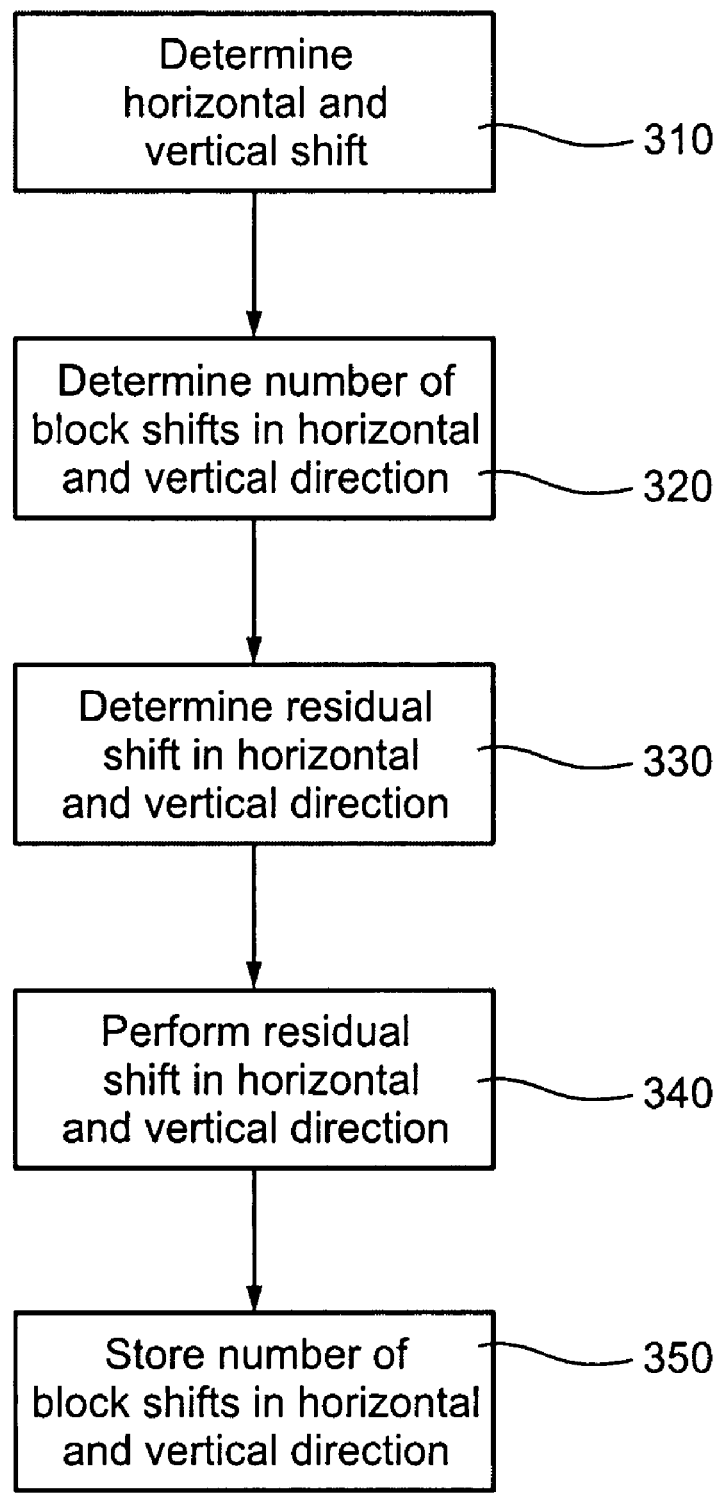
FIG. 3 is an exemplary flow chart describing a method for aligning images according to some embodiments of the present invention.

Reference is now made to FIG. 3 showing a flow chart describing a method for aligning images according to some embodiments of the present invention. The horizontal and vertical shift transformation between two images to be stitched is determined in the image domain, optionally in real-time, e.g. in real time and/or on the fly as the image frame series are captured (block 310). Optionally, geometrical projection, e.g. cylindrical projection, spherical projection, and/or lens correction projection is applied on image before the shift calculation. The required shifting is divided by the block size of the image in the transform domain and the number of block shifts (block 320) as well as the residual shift (block 330) is determined. Typically a block size in a DCT domain is 16×16 pixels, 8×8 pixels and/or some combination of 16 pixels in one direction (horizontal and/or vertical) and 8 pixels in the other direction. The residual shift is the remaining shift that is less than a full block size. For example, if a horizontal shift of 59 pixels and a vertical shift of 32 pixel is required using a 16×16 DCT block, that would translate to 3 block shift and 11 pixel residue in the horizontal direction and a 2 block shift and 0 pixel residue in the vertical direction. According to some embodiments of the present invention and typically for constructing substantially seamless integrated panoramic images, the residue shift is performed in the image domain (block 340) and the image is stored with the residue shift. Shifting in the image domain is performed by methods known in the art. According to some embodiments of the present invention, if the images are stored in a raster format in memory, XY shifting of pixels is performed by modifying the image starting address. For example the image starting address is modified by X+(Y*Line Length) pixels, where X is horizontal shifting and Y is vertical shifting and Line Length is the length of the line, such that X, Y and Line Length are in units of pixels. Horizontal and vertical block shift are stored (block 350) for post processing in the transform domain, e.g. in a compressed format. In some exemplary embodiments the size of the panoramic image is determined from the number of images to be included in the panoramic and the relative alignment and/or overlapping between them. The size of the panoramic image may be determined in real time and stored as a parameter for the post processing procedure.

Figure 4:
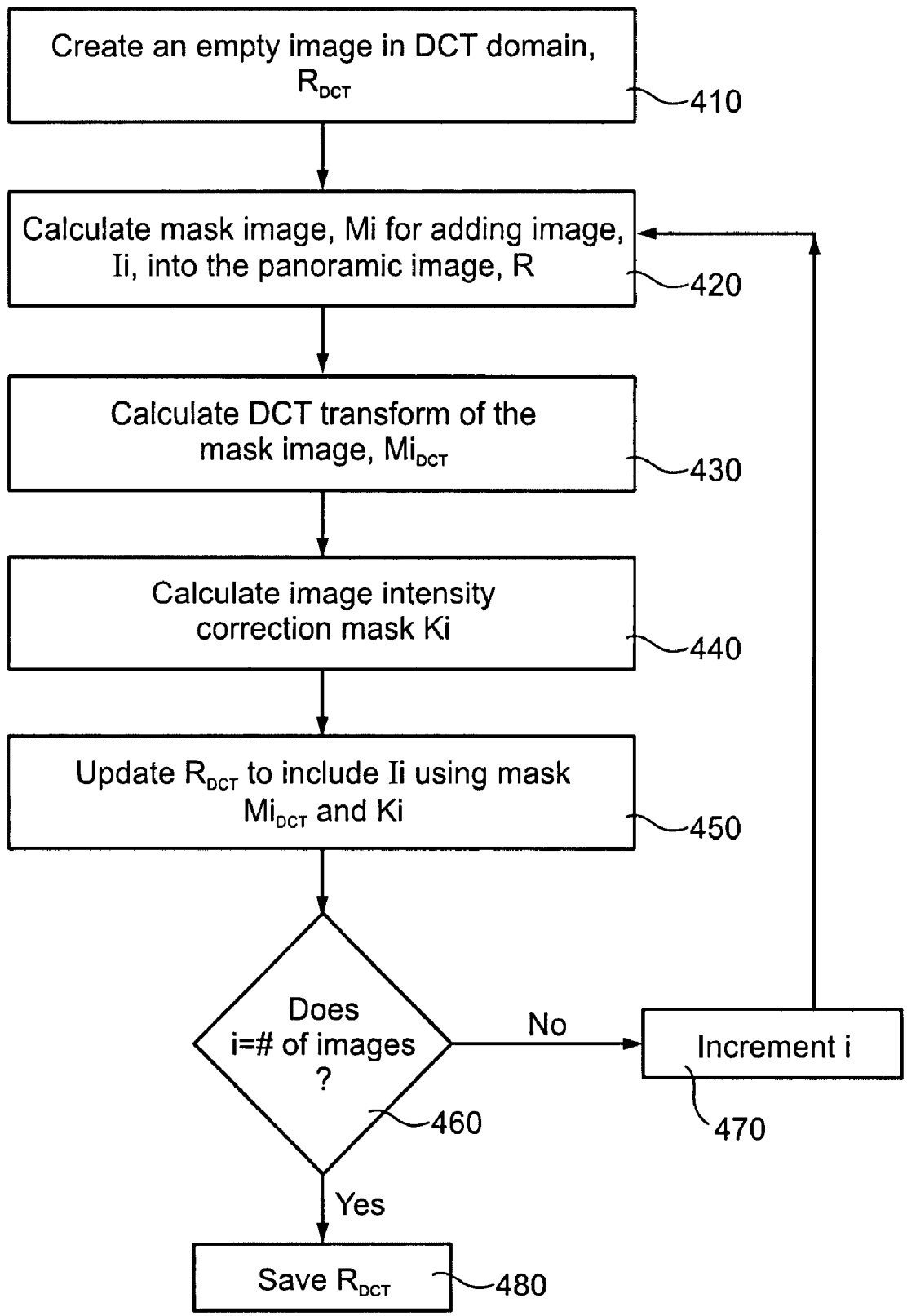
FIG. 4 is an exemplary flow chart describing a method for constructing a panoramic image using a mask defined in a transform domain according to some embodiments of the present invention.

Reference is now made FIG. 4 showing an exemplary flow chart describing a method for aligning and combining images according to some embodiments of the present invention. According to some embodiments of the present invention, an empty image or a black image is created by defining its header with memory allocation for the stream (block 410). In some exemplary embodiments, an empty or black image is created and used to construct a combined image when working in the transform domain without applying a Huffman decoder. The size of the empty image may be a maximum size for a panoramic image, may be defined by the number of frames to be used to create the panoramic image or may be based on a defined size of the panoramic image determined and recorded during capturing of the sequence of images and based on the number of images and the degree of overlapping between them. A mask image is optionally calculated for adding each of the images and blending and/or stitching them to form the panoramic image (block 420). The mask defines the blending method. In an exemplary embodiment of the present invention, the mask may be similar to the masks described in incorporated reference United States Patent Application 2004136603 to Vitsnudel et al. In one exemplary embodiment the mask may be a binary mask that either accepts or rejects a portion of the each image frame, e.g. in the overlapping region. In another exemplary embodiment, the mask may be a continuous mask that gradually fades in and out portions if the image frames that overlap. In yet another exemplary embodiment the mask includes binary portions and continuous portions. A DCT transform of the mask is calculated (block 430) to stitch the images in the DCT domain.

According to embodiments of the present invention, a mask is a pixel-wise operation applied to an image. In some exemplary embodiments, for each pixel and/or group of pixels in the image there is a matching value in the mask. A mathematical operation is performed between each element in the mask and the corresponding pixel and/or group of pixels producing a result image. Typically, the resolution of the mask is the same as that of the image. However, while operating in the DCT domain the mask may be used with a pre-defined number of AC coefficients.

Optionally, the stitching line is positioned in an area that does not include faces, so that the stitching line does not run on a face area. Specifically the human eye is very sensitive to distortion in faces, e.g. distortions caused by a stitch. The mask line can be affected by the content of the image to avoid detectable distortions in specific areas of the image. In an exemplary embodiment of the present invention, a pattern detection engine is employed to detect a region including a face or other pre-defined features to determine an area where stitching should be avoided. For example, a face detection engine can be applied so that a stitching line will circumvent the face, e.g. the stitching line will not cross the face. A pattern detection engine may be implemented to detect other content and/or pre-defined features in the image to which the human eye is sensitive to its distortion. In another example, pattern detection can identify a sharp border in a portion of an overlapping region, e.g. high contrast border, along which stitching is desirable. In an exemplary embodiment of the present invention, a pattern detection engine compares the content of overlapping areas to detect an object that moved and avoids doubling the object in the overlapping area. Typically, a stitching line that is not straight, e.g. not based on purely horizontal and vertical segments, is chosen to help hide the seam between the images. Typically, the human eye is sensitive to stitching lines that are straight. Typically content detection of the image is performed in the transform domain using only the first or the first few coefficients in a block of an area to be combined.

Optionally, when combining images to form a substantially seamless panoramic image, in addition to defining a mask to stitch the images, an image intensity correction map is defined to correct for fixed exposure differences between the images and vignette artifacts near the overlapping borders (block 450). The DCT mask for stitching and for image intensity correction is applied to the defined empty mask (block 460) and the sequence of images is incrementally added to the empty image (blocks 460 and 470). The final panoramic image is saved (480). According to some embodiments of the present invention, cropping is performed to the final image after the sequence of images is added to the empty image. According to some exemplary embodiments of the present invention, additional masks are defined and applied to the resultant panoramic frame. For example, a mask defining decorative borders, text and/or graphics, or decoration to be added to the resultant image can be defined and applied. Typically all masks are applied in the transform domain, e.g. the DCT domain. Optionally, the resultant panoramic image is rotated 90 degrees in a counter-clockwise direction to restore the image to its original orientation.

Figure 5:
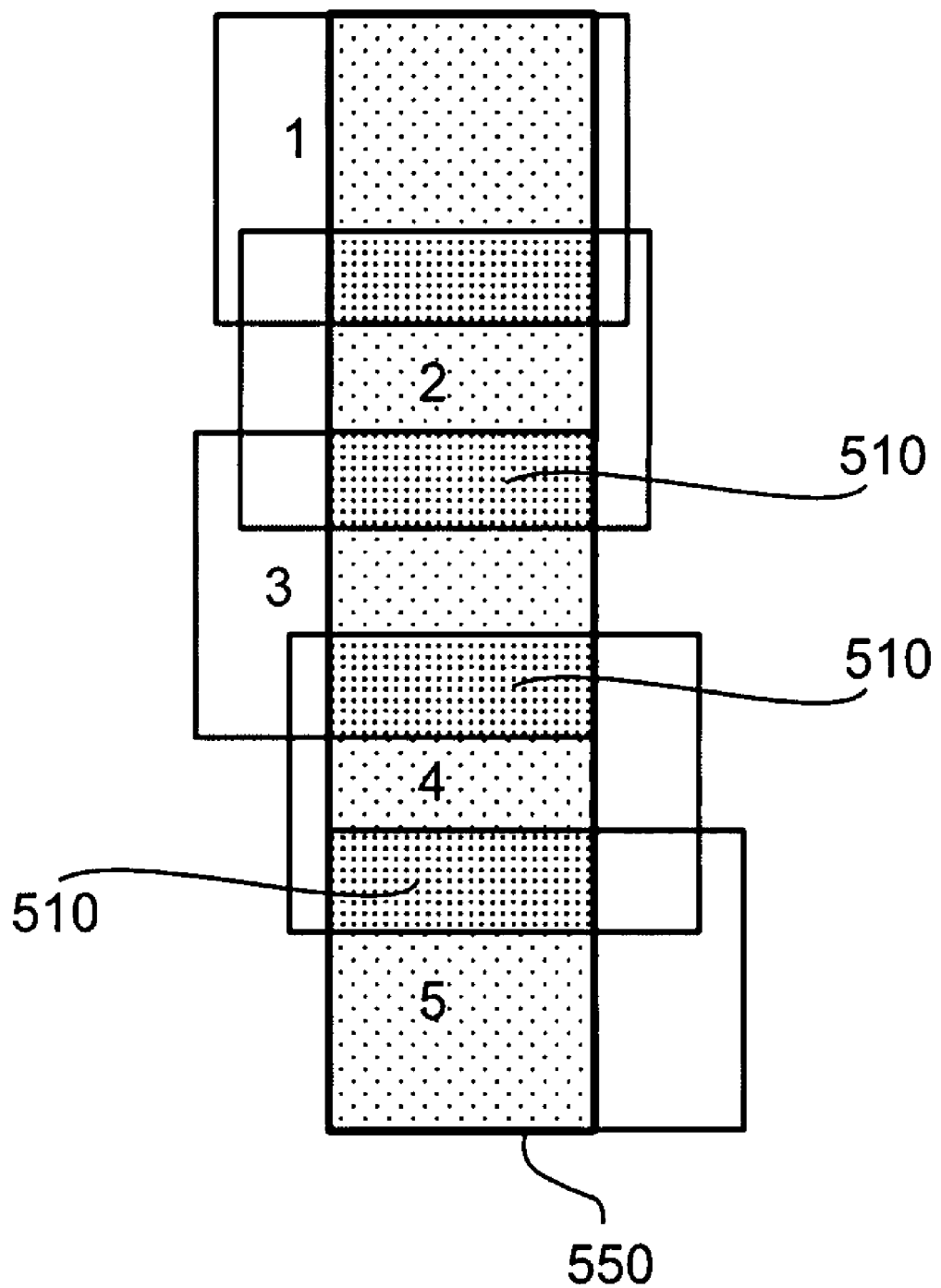
FIG. 5 is an exemplary schematic illustration showing a series of images combined to form a substantially seamless panoramic image according to embodiments of the present invention.

Reference is now made to FIG. 5 is an exemplary schematic illustration showing a series of images combined to form a substantially seamless panoramic image according to embodiments of the present invention. According to embodiments of the present invention, one or more overlapping images 1-5 are formed to construct a substantially seamless panoramic image 550. In an exemplary embodiment, image frames 1-5 are stored with a 90 degree clockwise rotation so that stitching is performed in a vertical direction. Image frames 1-5 are positioned using a shift transformation defined in the image domain. Stitching in overlapping areas 510 is performed by defining masks in the transform domain. Optionally the stitching line is determined based on the image content in the overlapping areas and one or more blocks in the transform domain may be expanded, e.g. partially expanded to determine the image content in the overlapping regions. Optionally an intensity correction mask is applied and one or more blocks in the transform domain may be expanded, e.g. transformed back with all coefficients and/or partially expanded to determine intensity information in an overlapping region. In some embodiments of the present invention, the resultant panoramic image is cropped to form a rectangular panoramic image 550. Optionally, the panoramic image is blended with a decorative background, e.g. a decorative background pre-stored in the transform domain.

Figure 6:
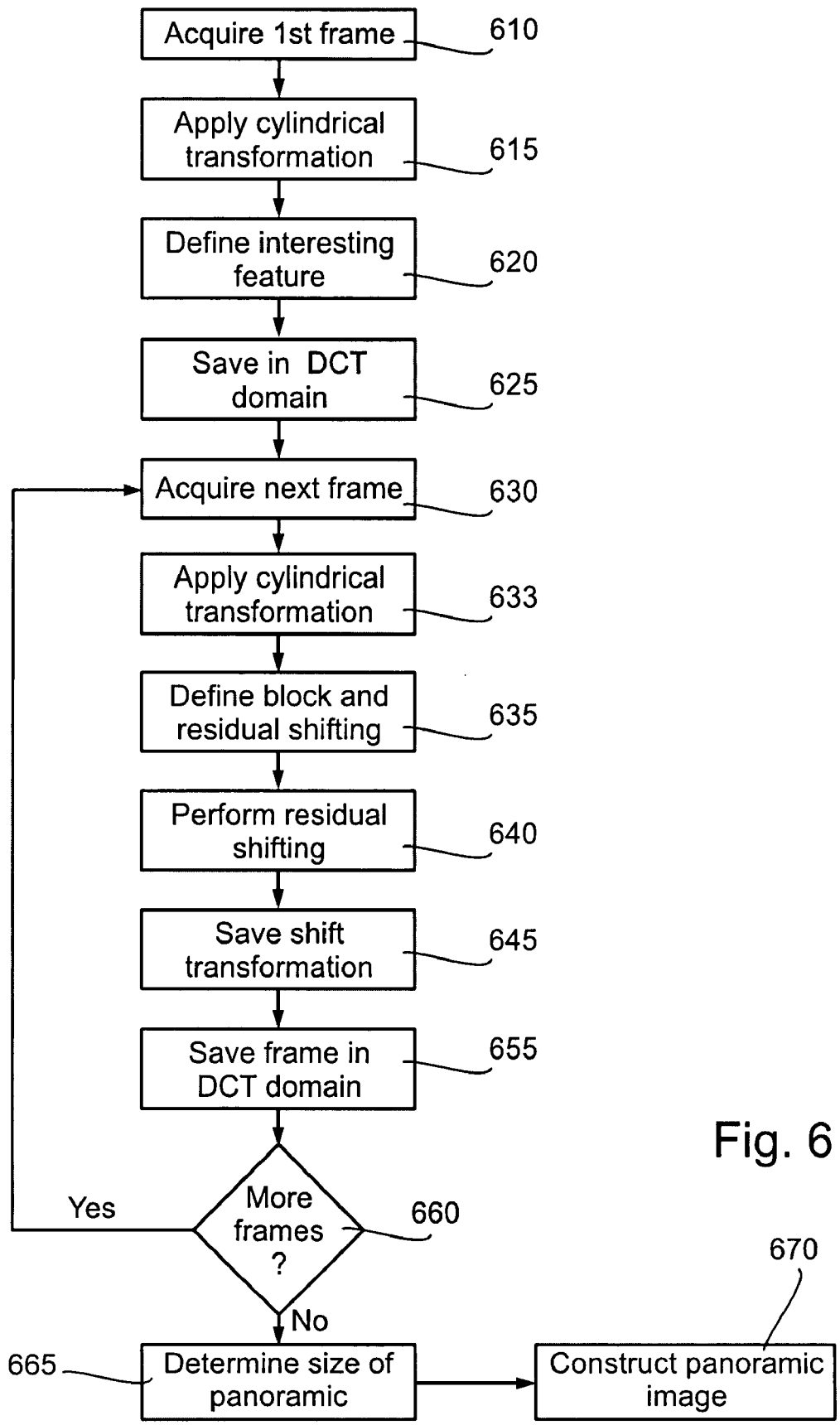
FIG. 6 is an exemplary flow chart describing a method for constructing a panoramic image that is substantially seamless image according to some embodiments of the present invention.

Reference is now made to FIG. 6 showing an exemplary flow chart describing a method for constructing a panoramic image that is a substantially seamless panoramic image and/or substantially seamless stitched image according to some embodiments of the present invention. According to some embodiments of the present invention, a first frame is captured (block 610). In some exemplary embodiments the captured image to be used in the resultant panoramic image is manipulated with a cylindrical transformation (block 615). The interesting features that can be used to define shift mapping with a subsequent image and their coordinates are identified and saved (block 620). Typically, the first image frame is a snapshot image. Optionally, a preview image, for example a preview image captured substantially in the same location as the snapshot image and/or stored in a lower resolution is saved in memory in image domain so that it can be used to define the shift transformation between the first snapshot image and the subsequent image. Typically image frame are saved in JPEG format, e.g. in the DCT domain (block 625). A subsequent frame that is partially overlapping the first frame is captured (block 630). Optionally, geometrical projection, e.g. cylindrical projection, spherical projection, and/or lens correction projection is applied on the captured image (block 633). Shift transformation between the first captured frame the subsequent frame is defined. Optionally, the subsequent image (as well as the first frame) may be tested for suitability. For example, the approximate brightness level of the image frame may be determined, the sharpness of the image frame may be determined, etc. If the frame is determined to be suitable, shift transformation with the previous image frame is determined. If the frame is determined not to be suitable, an alternate frame may be captured and/or a preview frame may be used to form the resultant panoramic image. In one exemplary embodiment, registration is performed between a preview image representing the first frame and a preview image representing the subsequent frame. In another exemplary embodiment, registration is performed between a preview image representing the first frame and the subsequent frame, a snapshot frame. Optionally shift transformation is defined by detecting on the subsequent frame the location of an interesting feature located on the first frame. Optionally, shift transformation is determined by performing registration between two full snapshot images. Typically vertical and horizontal shift between the previous and current frame is determined. Optionally, tilt and/or rotation between the two frames may also be determined and a tilt shift may be defined. The amount of horizontal and vertical shift is divided by the block size used in the DCT domain to save the captured images. For example if a 16×16 pixel block size is used, the shift in the horizontal and vertical directions is divided by 16 and the number of 16 pixel shifts required as well as the residual shift is determined (block 635). Optionally the horizontal and/or vertical block size may be another size, e.g. 8 or 32. According to some embodiments of the present invention, the required residual shifting is performed in the image domain prior to saving the image in a compressed format, e.g. JPEG format (block 640). The number of block shifts, e.g. whole block shifts is saved for the stitching process performed in a post-processing procedure (block 645). The image is saved in a DCT domain (block 655). Shift transformation calculations may be performed before or after the cylindrical transformation. Additional subsequent images with partially overlapping frames may be captured until a decision is made that no more frames are required (block 660), e.g. based on user indication or when reaching a defined maximum number of frames. Optionally the limit on the number of additional frames may depend on the current size of the panoramic image and/or the memory size. The size of the resultant image may be determined (block 665) based on the number of image frames captured and the calculated shift transformation, e.g. amount of overlap in the vertical and horizontal direction. During a post processing procedure the captured and selected images are stitched into a panoramic image based on the shift transformation defined as saved (block 670). Optionally the constructed panoramic image is blended with a decorative background, e.g. selected by the user.

According to some embodiments of the present inventions, a series of images are combined to form a mosaic panoramic image. Mosaic panoramic images are one or more image frames that are juxtaposed to provide a wide view of a physical space, e.g. a view that is wider than each of the individual image frames. According to some embodiments of the present invention, the mosaic panoramic image may be a suitable solution for providing panoramic images with mobile platforms especially for amateur users. Typically, stitching snapshot images accurately can be difficult on mobile platforms, requiring high processing capability. Artifacts due to motion parallax, motion of objects in neighboring image frames, as well as lack of proper overlapping area may compromise the quality of the stitching. The present inventors have found that providing mosaic panoramic option avoids these and other typical difficulties and can provide a fun, intriguing result. In addition, printing of high aspect ratio images on standard aspect ratio paper creates large "empty" spaces that are not pleasant when viewing. Mosaics can fill these gaps with graphics and decorative borders. High resolution decorative borders are optionally stored in the transform domain in a compressed format.

Figure 7:
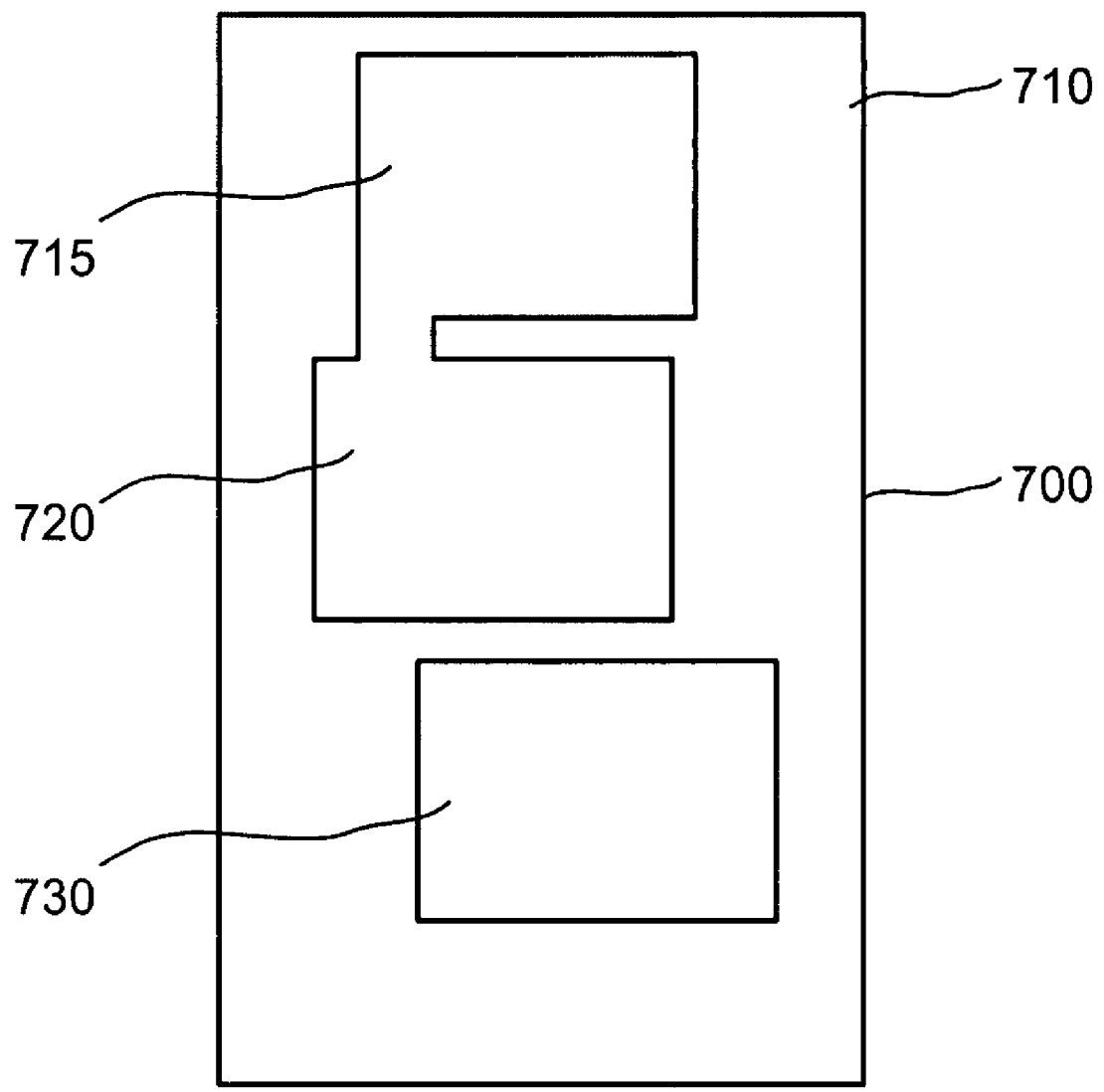
FIG. 7 is an exemplary schematic illustration showing a series of images aligned as a mosaic to form a mosaic panoramic image according to embodiments of the present invention.

Reference is now made to FIG. 7 showing an exemplary schematic illustration showing a series of images combined as a mosaic to form a panoramic image according to embodiments of the present invention. Panoramic image 700 includes image frames 1-3, that do not necessarily and/or completely overlap but are aligned with respect to the content of the image to provide a panoramic feel to the mosaic. In an exemplary embodiment image frames 1-3 are rotate 90 degrees clockwise from the original orientation so that the image frames can be combined in a vertical direction. According to embodiments of the present invention decorative frames can be used to fill the spaces between image frames 1-3 and special effects can be implemented to distract the viewer from mismatched content in the images. One or more high resolution templates can be saved and integrated into the mosaic panoramic during stitching. Templates may include graphics and/or text that can be included in the mosaic, e.g. superimposed on the images. In exemplary embodiments of the present invention, the mosaic is blended with a decorative background 710. In an exemplary embodiment, the panoramic image 600 is rotated counter clockwise by 90 degrees to restore the original orientation of the image frames.

Figure 8A:
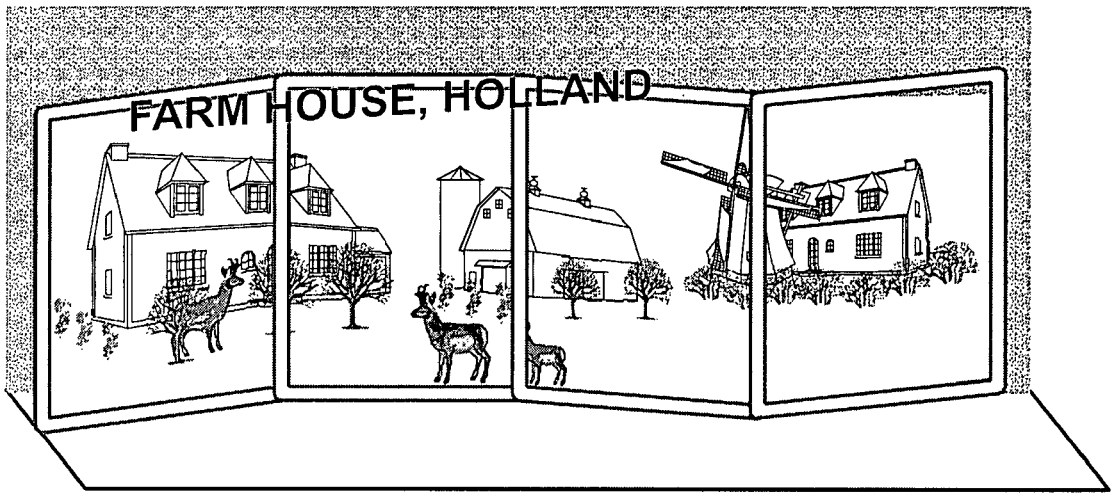
FIGS. 8A, 8B, and 8C showing schematic mosaic panoramic images according to some embodiments of the present invention.
Figure 8B:
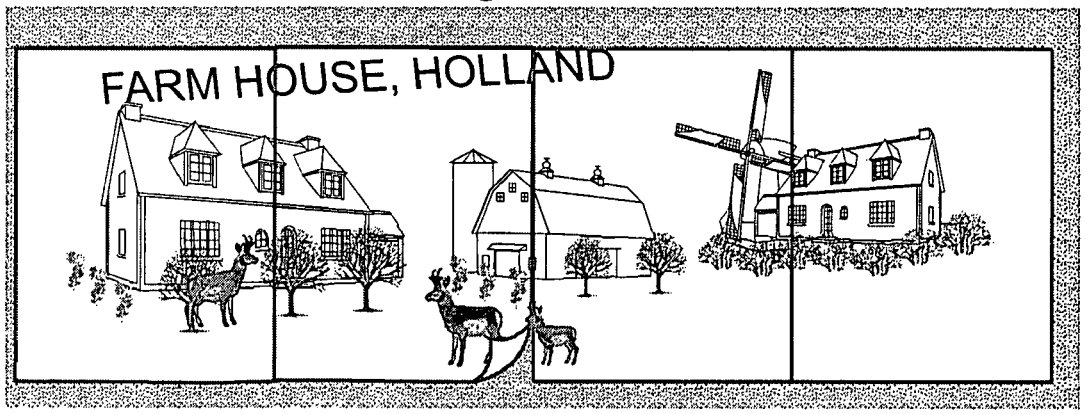
Figure 8C:
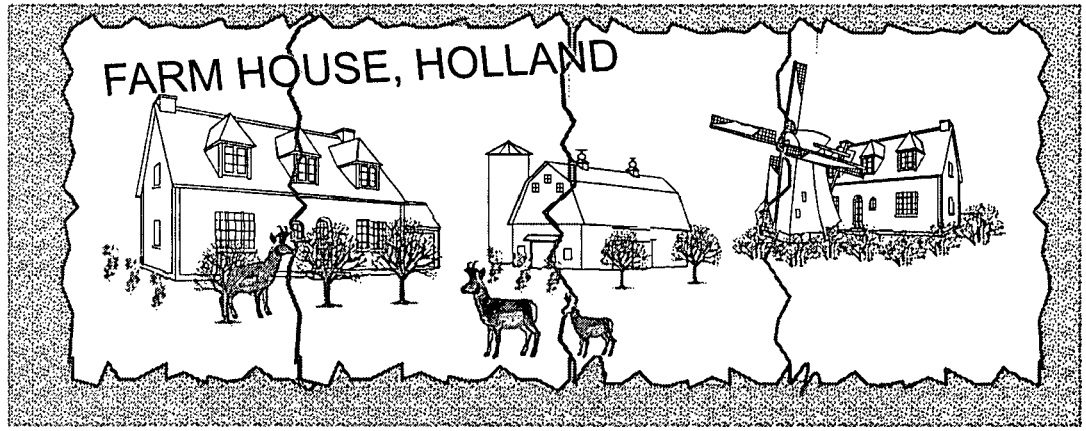

Reference is now made to FIGS. 8A-8C showing schematic mosaic panoramic images constructed from 4 image frames including decorative backgrounds, frames, graphics and/or text. In FIG. 8A almost no overlapping is shown between the images. In FIG. 8B and 8C overlapping and integration between the images is shown with a decorative effect to distract the eye from distortion, misalignment, mismatching, e.g. due to local movement or depth differences, and/or other deficiencies that may be found in the stitching area. Integration of the panoramic image with an interesting background as shown in FIGS. 8A-8C can also be used when constructing a seamless panoramic image as described herein.

Figure 9:
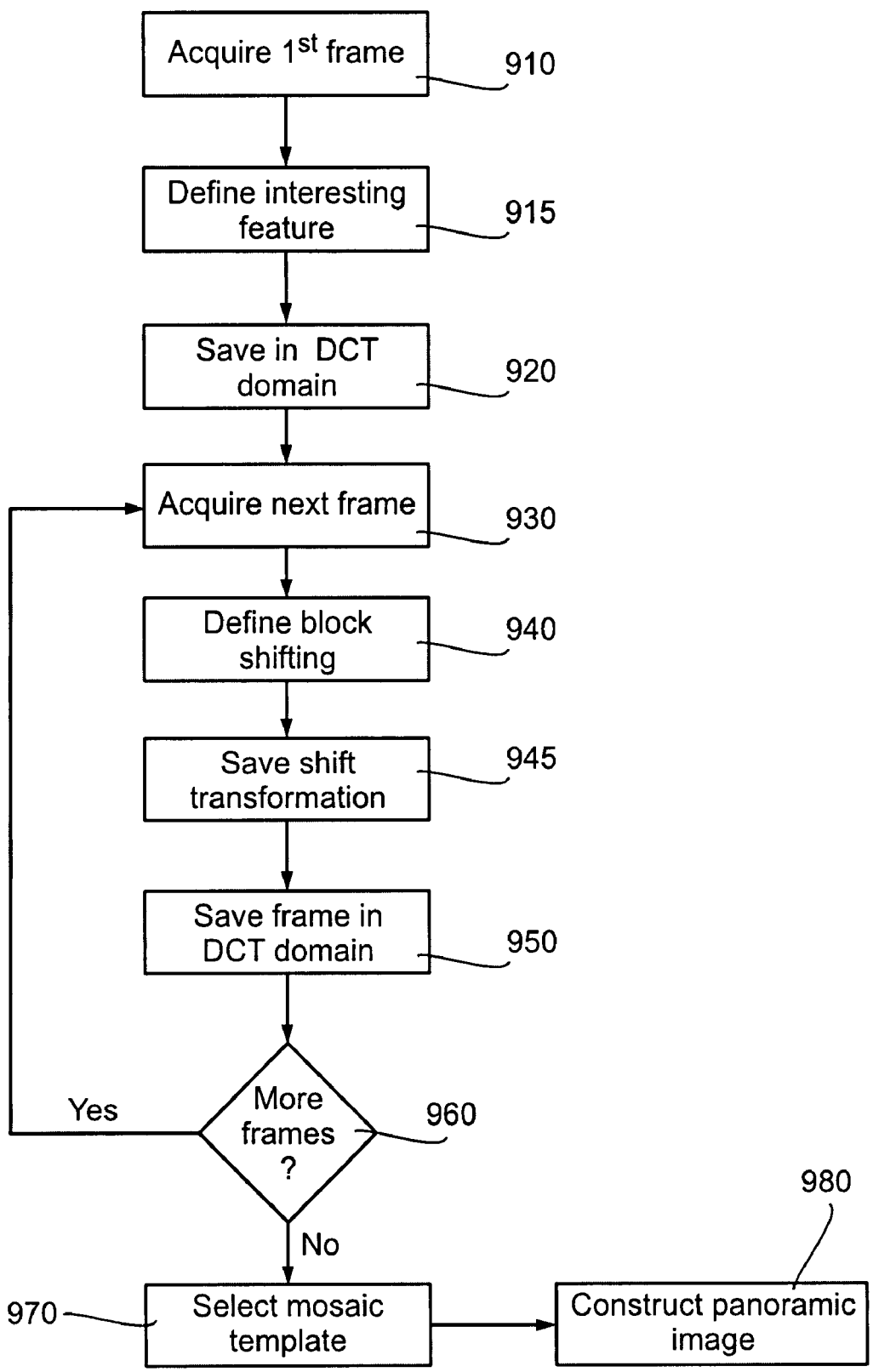
FIG. 9 is an exemplary flow chart describing a method for constructing a panoramic image that is mosaic image according to some embodiments of the present invention.

Reference is now made to FIG. 9 showing an exemplary flow chart describing a method for constructing a panoramic image that is a mosaic panoramic image. According to some embodiments of the present invention, a first frame is captured (block 910) and interesting features that can be used to define shift mapping with a subsequent image and their coordinates are identified and saved (block 915). Typically, the first image frame is a snapshot image. Optionally, a preview image, for example a preview image captured substantially in the same location as the snapshot image is saved in memory in image domain so that it can be used to define the shift transformation between the first snapshot image and the subsequent image. Optionally, the resultant panoramic image is saved with a cylindrical transformation. Typically image frame are saved in JPEG format, e.g. in the DCT domain (block 920). A subsequent frame that is partially overlapping the first frame is captured (block 930). Shift transformation between the first captured frame the subsequent frame is defined. Optionally, the subsequent image (as well as the first frame) may be tested for suitability. For example, the approximate brightness level of the image frame may be determined, the sharpness of the image frame may be determined, etc. If the frame is determined to be suitable, shift transformation with the previous image frame is determined. If the frame is determined not to be suitable, an alternate frame may be captured. In one exemplary embodiment, registration is performed between a preview image representing the first frame and a preview image representing the subsequent frame. In another exemplary embodiment, registration is performed between a preview image representing the first frame and the subsequent frame, a snapshot frame. Optionally shift transformation is defined by detecting on the subsequent frame the location of an interesting feature located on the first frame. Optionally, shift transformation is determined by performing registration between two full snapshot images. Typically vertical and horizontal shift between the previous and current frame is determined. Optionally, tilt between the two frames may also be determined. The amount of horizontal and vertical shift is divided by the block size used in the DCT domain (block 940). The number of block shifts, e.g. whole block shifts is saved for the stitching process performed in a post-processing procedure (block 945) and the image is saved in a DCT domain (block 950). Additional subsequent images may be captured until a decision is made that no more frames are required (block 960), e.g. based on user indication or when reaching a defined maximum number of frames. The template to be used to construct the mosaic panoramic image is selected (block 970) and the mosaic panoramic image is constructed during a post processing procedure (block 980).

Figure 10:
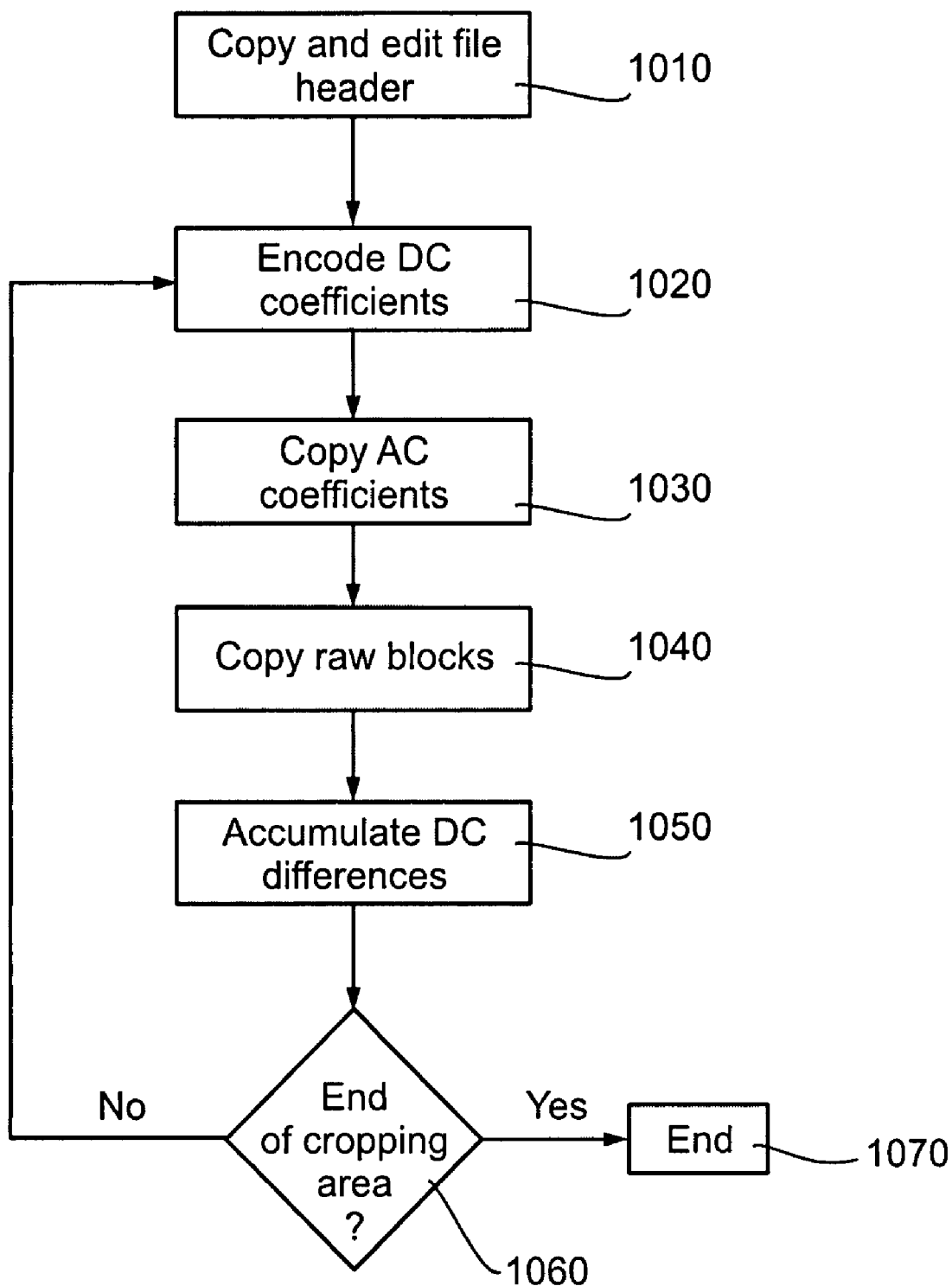
FIG. 10 is an exemplary flow chart describing a method for cropping a series of image frames used to form a panoramic image according to some embodiments of the present invention.

Reference is now made to FIG. 10 showing an exemplary flow chart for cropping a series of image frames used to form a panoramic image according to some embodiments of the present invention. According to some embodiments of the present invention, cropping of the combined image frames is performed in the transform domain to obtain a rectangular panoramic image. Cropping is performed with a resolution of a single block size. In the DCT transform domain, typically the blocks include a DC value which is the difference value from a previous block and AC components. The fact that the DC value of each block is the difference from previous blocks may force a non-trivial cropping and/or copying process. To crop and copy the desired section of the image frame, the file header of the JPEG format image is copied while changing only the parameters referring to image size (block 1010). All the blocks prior to the block to be copied are expanded so that all the coefficients are decoded. The DC coefficients of each component are summed. For the first block of each type, the DC is encoded (block 1020); the difference is accumulated according the real DC value, referring to the last DC value in the stream. The AC components are copied as bit sets that may require bits alignment to the existing stream (1030). The blocks that remain in the raw can be copied as bit sets (block 1040). Optionally bit alignment may be required, since blocks decoded in bits sequence may include a number of bits that is not a multiplication of 8. The bits of the next block must be appended to the bits of the previous block. For the skipped block, the differences in the DC values are accumulated, so the first block in the next line will include the correct differences (block 1050). Blocks 1020, 1030, 1040, 1050 are repeated until the end of the cropping area is reached (block 1060) and the cropping is ended (block 1070).

Figure 11:
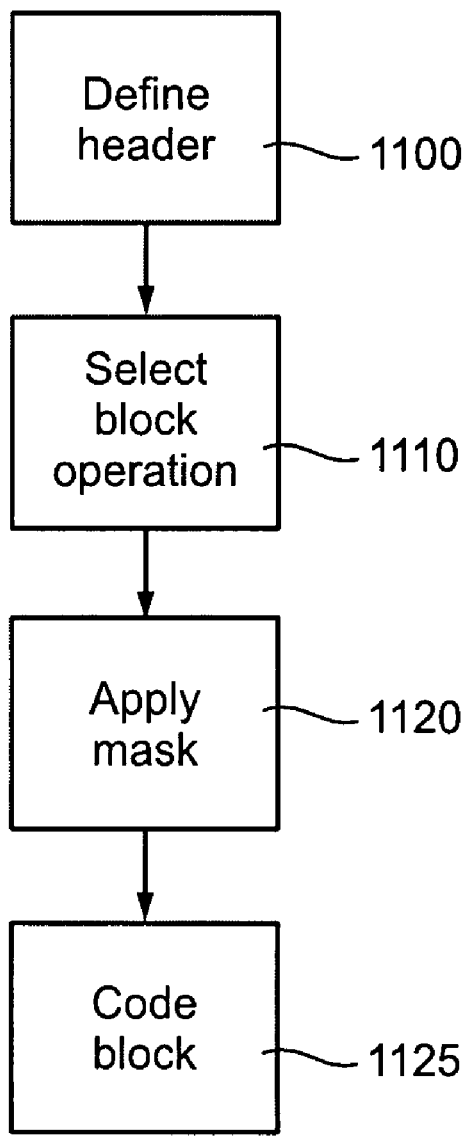
FIG. 11 is an exemplary flow chart describing a method for combining images using masks according to some embodiments of the present invention.

Reference is now made to FIG. 11 describing a method for combining images using masks according to some embodiments of the present invention. According to some embodiments of the present invention, a JPEG image of two or more combined image frames is created by setting a header (block 1100). Typically the header defines the size of the new image, e.g. the height and width of the combined image. Once the header is defined, the new combined image is created by appending a stream of image data block by block from the two or more image frames to be combined. The appended image data blocks are typically based on corresponding blocks of the two or more images, e.g. source images, to be combined.

One or more operations to be performed on the source images may be defined (block 1110). For example, copying of a block from one of the source images, partial copying of a block from one of the source images, e.g. by saving only pre-defined number of AC components of the block, performing convolution with a defined mask in the transform domain, combining blocks from the different source images using for example, mask convolution in the transform domain. Operations other than operations on the source images may also be defined, e.g. copying a background from a template. Based on the selected operation, a corresponding mask is optionally defined and applied (block 1120). For example, for a copy operation, a unit matrix mask for the block to be copied is defined and applied. In another example, two or more blocks are combined using an algebraic mode or using mask convolution in the transform domain. For example, to create a new block from a combination to two source blocks, two masks, M1 and M2 may be defined to be applied on two corresponding source blocks I1 and I2, such that the new block $I_b=M1*I1_b+M2*I2_b$, where $M1+M2<=1$. Other masks such as described in incorporated US Patent Application 2004136603 and/or similar masks may be applied. In some examples, masks may include special saturation handling. Masks to correct for intensity may be applied. More than one mask may be applied to a source block. Once the desired operation is applied, the block can be coded to the desired and/or relevant format, e.g. coded by the relevant quantization table and/or the relevant Huffman table (block 1125). The blocks operation should be done iteratively on all blocks of the output image.

According to some embodiments of the present invention, the methods described herein-above may be applied iteratively to combine more than two image frames. For example, a first and a second source image frame may be combined to form a first new image frame. Subsequently the first new image frame may be combined with a third source image frame using similar methods. This process may be repeated until all the desired image frames are combined.

Figure 12:
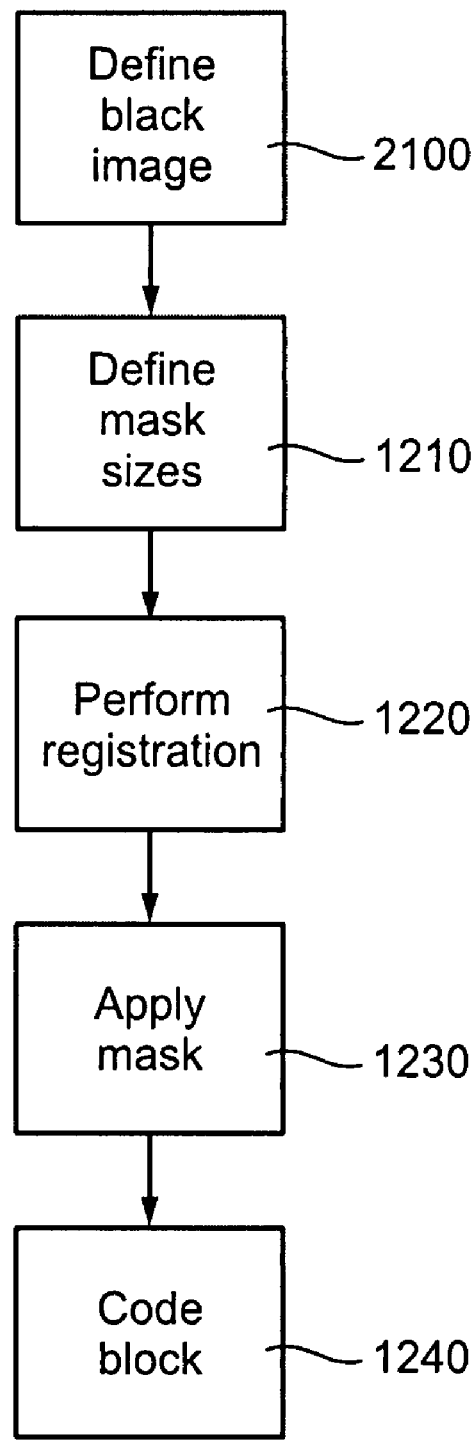
FIG. 12 is an exemplary flow chart describing a method for combining images using masks according to other embodiments of the present invention.
Figure 13A:
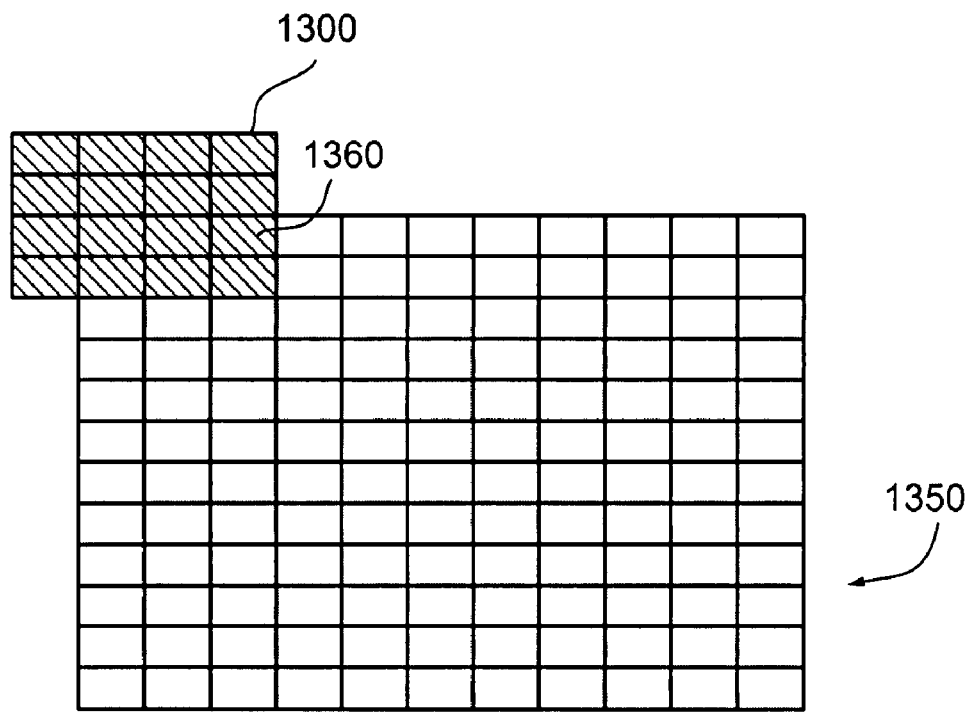
FIG. 13 is an exemplary block diagram showing registration between a defined mask and a source image frame according to some embodiments of the present invention.
Figure 13B:
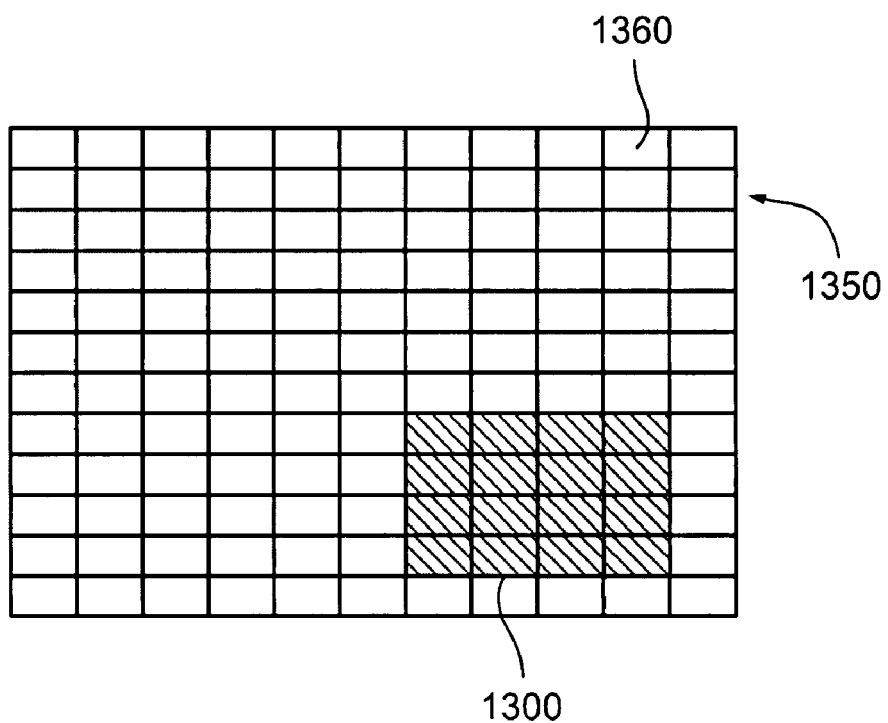

Reference is now made to FIG. 12 describing a method for combining images using masks according to other embodiments of the present invention. According to some embodiments of the present invention, each new block in an image data stream is created by applying mask operations on two input blocks, e.g. blocks from two image frames. According to some embodiments of the present invention, initially, a black and/or empty image is defined (block 1200). Two image frames are combined by defining two masks $M_A$ and $M_B$, each the size of the desired resultant image frame (block 1210). Registration and/or positioning of each source image, I1 and I2, is defined to set the shift of the source image frames with respect to their corresponding mask (block 1220). Reference is made to FIG. 13A and 13B showing positioning of source image frames with respect to a mask defined as the size of the resultant image frame. In FIG. 13A only a portion of source image frame 1300 is included in the defined mask 1350 (and therefore in the resultant image frame). Alternatively, in FIG. 13B the entire source image 1300 is positioned in an alternate position with respect to the mask. The positioning and/or registration of the image frames with respect to the mask are performed at block resolution. The block 1360 size is optionally the same in the mask and source image frame.

Reference is made back to FIG. 12. The operations defined by the masks are applied block by block (block 1230). The resultant new image frame, I, is defined by $I=M_A*I1+M_B*I2$, where $M_A+M_B<=1$. In some examples, the operation can be defined to use a black block whenever the mask is zero. In some examples, cropping is applied by binary mask where the one of the blocks (which relates to the zero mask) is optionally defined as a black block. The operation of color correction can be defined as $M_B<=1$. According to some exemplary embodiments, $M_B=1$ & $M_A=0$ is defined in blocks where no data is changed. $M_A=0$ & $M_B<=1$ is defined where data is replaced, and $M_A+M_B<=1$ where blending is applied. After the desired operations were performed, the block is coded, e.g. to the desired and/or relevant format, e.g. coded by the relevant Huffman table and the relevant quantization table (block 1240). Typically, the block will be coded so that the resultant image frame is in JPEG format.

According to some embodiments of the present invention, the process described herein above, e.g. in reference to FIG. 12 is performed iteratively until all the image frames desired are combined. For example, initially when combining the first two images, I1 is defined as a black image and I2 is defined as a source image frame. The source image frame is combined and/or added to the black and/or empty image. The size of the mask in the case is typically the size of the output image frame. Subsequently I1 is defined as the result image from the previous iteration, e.g. the source image frame, and an additional source image I2 is combined with I1. For creating panoramic image frames, the mask sizes in this iteration will typically be larger than the mask size in the previous iteration. The iterations continue until the last desired image is combined. In some exemplary embodiments, template image frames including decorative borders, or other contents can be combined with one or more source image frames. In one exemplary embodiment, a template image may be used instead of the initial black and/or empty image frame. According to some embodiments of the present invention, standardizing the combining method by requiring that each new block in an image data stream is created by applying mask operations on two input blocks, may optimize the procedure for combining image frames.

According to some embodiments of the present invention, the iterative process may be performed on the fly as subsequent image frames are combined. For example, after each image frame is captured it may be combined to the previous image frame and/or an empty image frame concurrently and/or before the following image frame is captured. Alternatively, the processing may be performed off-line.

Typically, operations in the DCT domain or in the transform domain include operation on the bits before and/or after Huffman decoding, before and/or after de-quantization, before and/or after de-triangulation.

Figure 14:
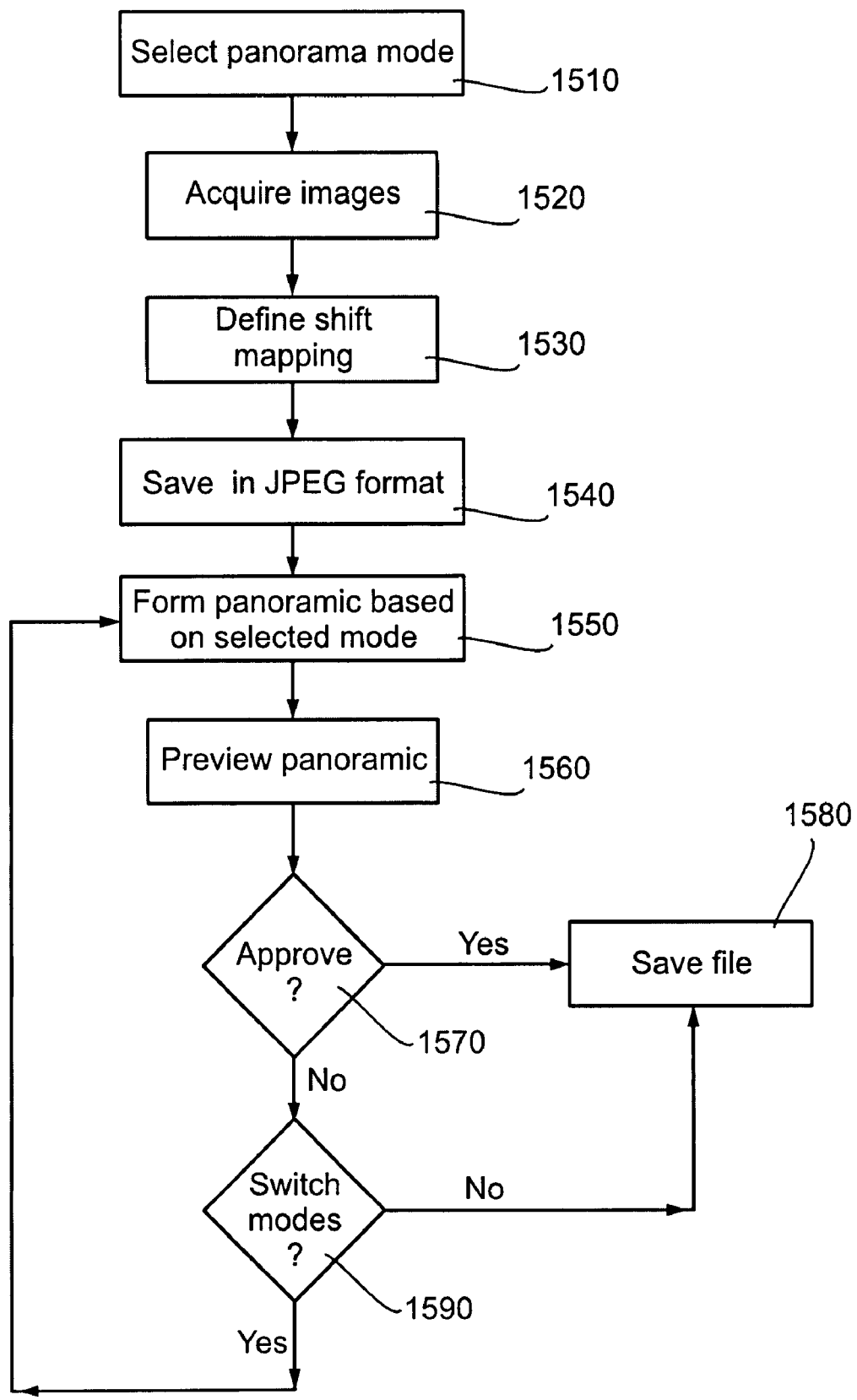
FIG. 14 is an exemplary flow chart describing a method for constructing a user selected panoramic image according to some embodiments of the present invention.

Reference is now made to FIG. 14 showing an exemplary flow chart describing a method for constructing a user selected panoramic image according to some embodiments of the present invention. According to some embodiments of the present invention, a user selects a panorama mode and the selection is received (block 1510). For example, a user may choose between a seamless panoramic image and a mosaic panoramic image. Typically a series of image frames are captured, e.g. at least two image frames (block 1520). In some exemplary embodiments of the present invention, image capturing is performed automatically while a user pans the camera view in one direction, e.g. horizontal and/or vertical direction. Typically, camera navigation is used to determine when to capture frames during panning so that a panoramic image can be formed. Optionally, captured image frames are tested for suitable and/or acceptable illumination and sharpness levels. Typically, for the seamless panorama mode more image frames with greater overlapping may be captured as compared to mosaic panorama mode. In some exemplary embodiment, a maximum of 8 frames are used to construct the panoramic image. In other exemplary embodiments there is no upper limit. In yet other exemplary embodiments, the limit may be more or less than 8 frames. Shift mapping, shift transformation and/or alignment between the capture image frames is defined in the image domain (block 1530) and then the image frames are saved, typically in JPEG format (block 1540). Optionally, the size of the resultant panoramic image is determined based on the shift mapping, size of the image frames and number if image frames. Optionally, the image processing is performed on the image frames before saving them, e.g. a cylindrical transformation of the image frame may be performed. A panoramic image frame is constructed in a post processing procedure based on the selected mode (block 1550). According to some exemplary embodiments of the present invention, the post processing procedure of stitching the image frames to form a panoramic image may take between 0.5-20 seconds, e.g. 5-10 seconds. The time period depends on the size and/or resolution of the image (and/or power of processor and speed of memory). For example, a 640×480 image may take 5-10 seconds to construct, while a 320×420 image may take less than 5 seconds to construct. Once construction is completed, the panoramic image is displayed to the user for approval (block 1560). Optionally, a thumbnail image of the panoramic is displayed and/or a preview version image is displayed. Approval is checked (block 1570). Upon approval the panoramic image is saved in the user's photo-album. If the user declines approval, a user is queried if a mode switch is desired (block 1590). For example, if a user originally chose a seamless panoramic mode and the results are not satisfactory to the user, a mosaic mode can be now chosen and a new panoramic image is constructed for the user's approval. Optionally, the user may choose to capture a new panoramic image. Optionally the user may choose to select a background to combine with the panoramic, to select decorative borders, to select text to add to the constructed image, and/or to select graphics and/or animation to add to the construct image.

Figure 15:
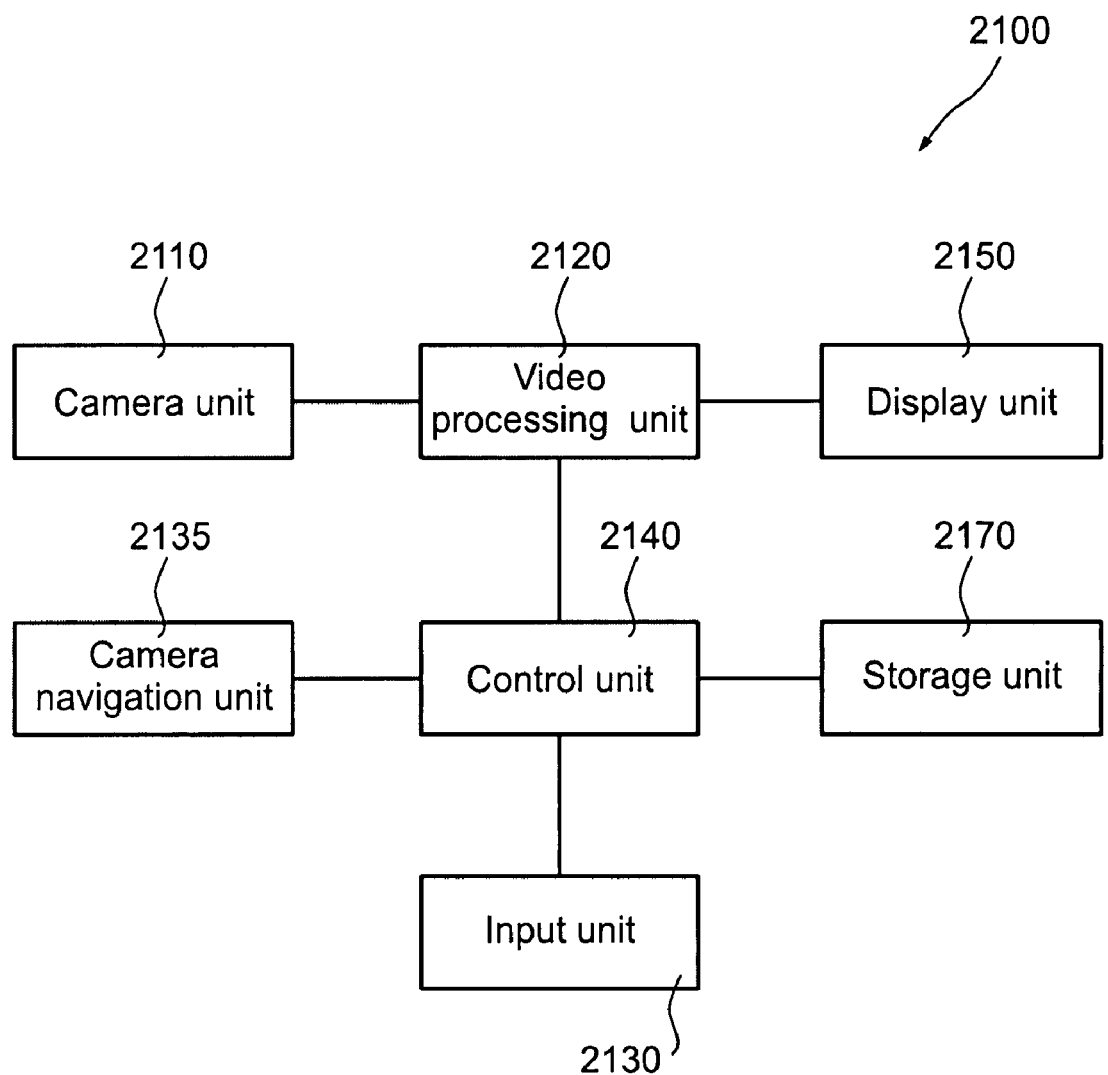
FIG. 15 is a simplified exemplary block diagram describing a mobile device used to construct an panoramic image according to some embodiments of the present invention.

Reference is now made to FIG. 15 showing a simplified block diagram of a mobile device 2100 including a camera unit 2110 for taking a picture, a display unit 2150 for displaying the panoramic image, and a storage unit 2170 for storing image frames, the resultant panoramic image application as well as other data. According to some embodiments of the present invention, mobile device includes a video processing unit 2120 for processing the picture by the camera unit 2110, an input unit 2130 for receiving a user input, and a control unit 2140 for generating a panoramic and/or composite image in accordance with an input signal received through the input unit 2130. Optionally, the mobile device includes a camera navigation unit 2135 to perform motion tracking on the basis of images and/or video stream captured by the camera unit 2110.

The camera unit 2110 is optionally implemented with an image pickup device or an image sensor such as a charged coupled device (CCD) and a complementary metal-oxide semiconductor (CMOS) device, for converting optical image into electric signals.

According to some embodiments of the present invention, system 2100 includes a pattern detection engine. The detection can be implemented by software and/or hardware. In one exemplary embodiment, the pattern detection engine is integrated into the control unit 2140. Alternatively, system 2100 is integrated into a processor separate from the processing capability of the control unit.

The video processing unit 2120 can be implemented with an analog-digital converter for the electric signal output from the camera unit 2110 into digital signals as video data.

The input unit 2130 can be implemented with at least one of a keypad, touchpad, and joystick. The input unit 2130 also can be implemented in the form of a touchscreen on the display unit 2150.

The camera navigation unit 2135 may be based on available CaMotion Inc. libraries, Eyemobile Engine software offered by Gesturetek's, or other available camera based tracking engines. The navigation unit may perform motion tracking on the basis of images and/or video stream captured by the camera unit 2110.

Figure 16:
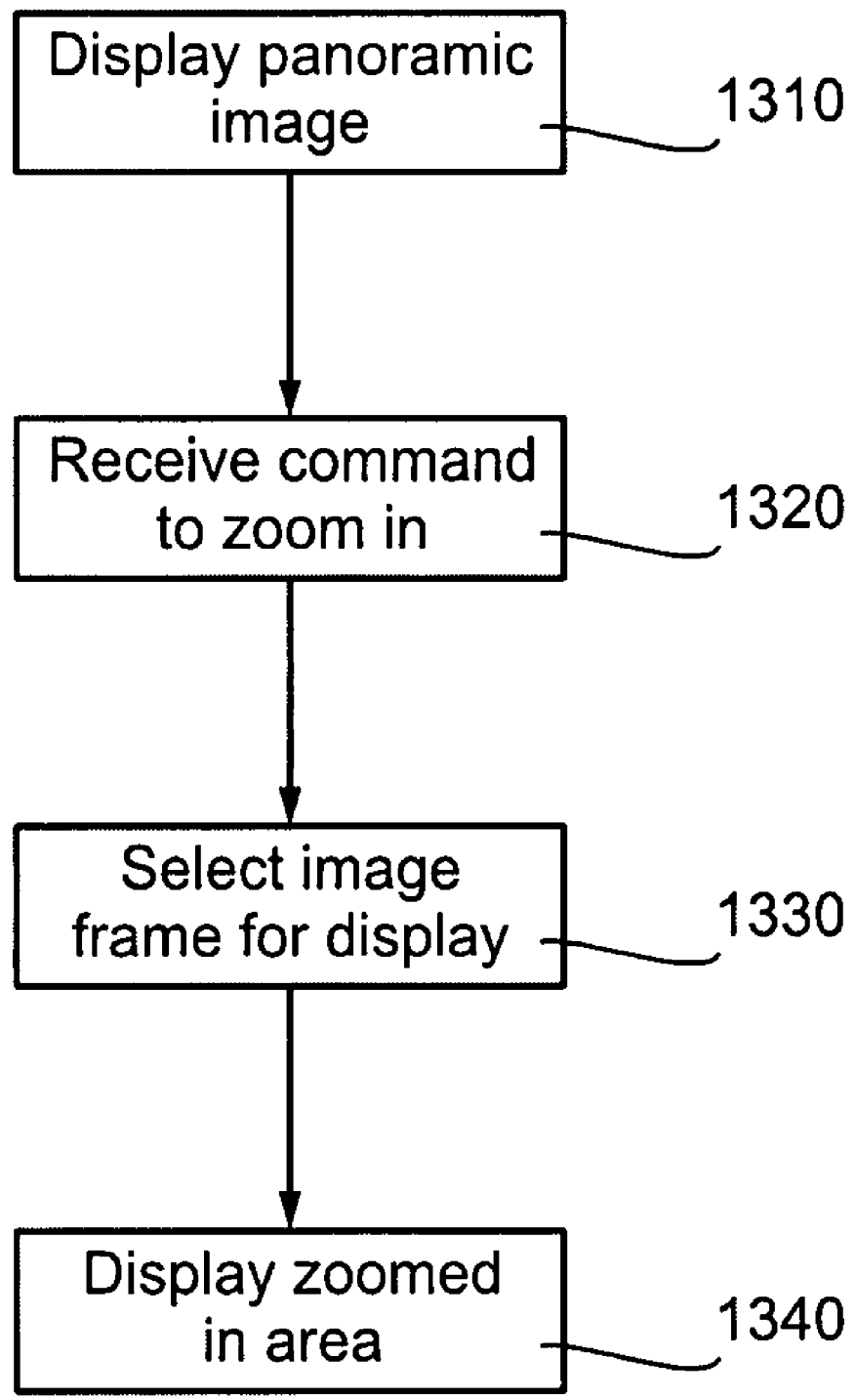
FIG. 16 is an exemplary flow chart describing a method for displaying panoramic images with various zoom levels according to embodiments of the present invention.

Reference is now made to FIG. 16 showing an exemplary flow chart describing a method for displaying panoramic images with various zoom levels according to embodiments of the present invention. A user may select with input unit 2130 a saved panoramic image frame for display. System 2100 displays the panoramic image (block 1310) on a display unit 2150. The system may receive a command originating from the input unit to zoom into portions of the panoramic image (block 1320). According to embodiments of the present invention, in zoom-in mode, control unit 2140 selects one of the image frames included in the panoramic for display (block 1330) and the zoom-in feature is actuated using the specific image frame selected that includes the area to be zoomed (1340). According to embodiments of the present invention, the switch between displaying the panoramic image and displaying a captured image frame included in the panoramic image occurs over a threshold zoom level. For example, if the user requests a zoom-in above 120 percent, a switch is made between full panoramic image and single captured image frame. Bringing up to memory a single captured image frame, instead of the entire panoramic image frame, allots more available memory required for zooming in. The panoramic image frame may have a resolution that is lower than the snapshot image frames. A user may pan along the image displayed in the zoom-in mode, e.g. pan left or right. As the user pans the image, the limits of the image selected by the control unit may be reached. According to some embodiments of the present invention, the control unit may select an alternate image frame included in the panoramic image for display as the user pans toward the limits of the image selected or towards an overlapping area in the panoramic image frame. The switch between image frames may be transparent to the user. In overlapping regions, the control unit decides which image frame from the overlapping image frames to display, for example, based on the content of the image frame. In an exemplary embodiment, the selection is based on the location of the stitching line in the panoramic image frame. For example, if the region selected for zooming in the panoramic image frame is taken from an image frame 'A' in an overlapping region between image frame 'A' and image frame 'B', image frame 'A' is selected when zooming into that region. As the user pans past the area of the stitching, image frame 'B' is displayed. According to some embodiments of the present invention, the panoramic image is displayed in zoom-in mode in the vicinity of a stitched area. Distortion that may occur when stitching two image frames may be noticeable in a zoom-in mode. In an exemplary embodiment, the stitching line is altered, e.g. moved, as a user pans in a specific direction, to avoid zooming into the stitched area. For example, stitching of the image frames is performed in a location away from the currently viewed area.

It should be further understood that the individual features described hereinabove can be combined in all possible combinations and sub-combinations to produce exemplary embodiments of the invention. Furthermore, not all elements described for each embodiment are essential. In some cases such elements are described so as to describe a best mode for carrying out the invention or to form a logical bridge between the essential elements. The examples given above are exemplary in nature and are not intended to limit the scope of the invention which is defined solely by the following claims.

The terms "include", "comprise" and "have" and their conjugates as used herein mean "including but not necessarily limited to".

The invention claimed is:

1. A computerized method for constructing a composite image using a processor, the method comprising:
   determining in an alignment between at least a first and a second image based on the content of the first and second image frames; and
   combining in a discrete cosine transform (DCT) domain at least the first and second images with the determined alignment to form a composite image using a processor.

2. The method according to claim 1 wherein the composite image is a panoramic image.

3. The method according to claim 2 wherein the panoramic image is a substantially seamless panoramic image.

4. The method according to claim 2 wherein the panoramic image is a mosaic panoramic image frame.

5. The method according to claim 1 wherein determining an alignment between at least a first and a second image is performed in the image domain.

6. The method according to claim 5 wherein the alignment is determined based on a DC portion of the DCT domain.

7. The method according to claim 5 comprising determining in the DCT domain, the intensity level of one of the first and second image frames.

8. The method according to claim 1 wherein the alignment includes a horizontal or vertical shift of the second image frame with respect to the first image frame.

9. The method according to claim 8 wherein the horizontal or vertical shift is divided into block shifts and residual shifts.

10. The method according to claim 9 wherein the residual shifts are performed in an image domain prior to transforming the second image to the DCT domain.

11. The method according to claim 9 wherein the block shifts are performed in the DCT domain.

12. The method according to claim 1 comprising:
    detecting in the image domain a location of a common interesting feature in each of the first and second image frame; and
    determining the alignment based on the location of the interesting feature in each of the first and second image frames.

13. The method according to claim 1 comprising:
    performing registration between preview image frames corresponding to the first and second image frames; and
    determining the alignment between the first and second image frames based on the registration.

14. The method according to claim 1 comprising determining alignment between the first and second image frames based on alignment with at least one image frame captured between the first and second image frames.

15. The method according to claim 14 wherein the at least one image frame is a preview image frame.

16. The method according to claim 1 comprising recording a size of the composite image based on the alignment.

17. The method according to claim 1 comprising performing geometrical transformation of the first and second image frame.

18. The method according to claim 14 wherein the geometrical transformation is a cylindrical transformation.

19. The method according to claim 1 wherein at least one of the first or second image frames is a full snapshot image frame.

20. The method according to claim 1 comprising saving the first and second image frame in a JPEG format.

21. The method according to claim 1 comprising:
    defining an empty image frame in the DCT domain; and
    positioning the first and second image frame onto the empty image frame based on the alignment.

22. The method according to claim 1 comprising:
    defining a header file with memory allocation; and
    adding a stream of image data blocks from the first and second image frame to the header file.

23. The method according to claim 1 comprising applying a mask in the DCT domain to combine the first and second image frame.

24. The method according to claim 23 wherein the mask is a binary mask.

25. The method according to claim 23 wherein the mask is a continuous mask.

26. The method according to claim 23 wherein the mask is a low pass version of a binary mask.

27. The method according to claim 23 wherein the mask is to define a stitching line to combine the first and second image frame in an overlapping region.

28. The method according to claim 27 wherein the stitching line is a curved stitching line.

29. The method according to claim 1 comprising:
    detecting a region including a pre-defined pattern; and
    defining a stitching line that circumvents the region.

30. The method according to claim 29 wherein the pre-defined pattern is a face.

31. The method according to claim 1 comprising applying a mask configured to correct image intensity differences between the first and second image frame.

32. The method according to claim 31 wherein the mask is configured to correct for vignettes.

33. The method according to claim 1 comprising combining in the DCT domain a decorative background with the composite image.

34. The method according to claim 1 comprising combining in the DCT domain text with the composite image.

35. The method according to claim 1 comprising combining in the DCT domain graphics with the composite image.

36. The method according to claim 1 comprising combining decorative frames with the composite image.

37. The method according to claim 1 comprising:
    capturing a plurality of image frames; and
    selecting in the image domain, image frames from the plurality of image frames to be included in the composite image.

38. The method according to claim 37 wherein the selecting is based on a detected intensity level of the image frames.

39. The method according to claim 37 wherein the selecting is based on a detected sharpness level of the image frames.

40. The method according to claim 37 wherein the selecting is based on the alignment between the image frames.

41. The method according to claim 1 wherein the combining is performed in a vertical direction.

42. The method according to claim 1 wherein determining an alignment between at least a first and a second image is performed in the DCT domain.

\* \* \* \* \*